(12) United States Patent
Moon et al.

(10) Patent No.: US 12,096,002 B2
(45) Date of Patent: Sep. 17, 2024

(54) METHOD AND APPARATUS FOR ENCODING/DECODING AN IMAGE

(71) Applicant: Industry Academy Cooperation Foundation of Sejong University, Seoul (KR)

(72) Inventors: Joo Hee Moon, Seoul (KR); Sung Won Lim, Seoul (KR); Dong Jae Won, Goyang-si (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 141 days.

(21) Appl. No.: 17/318,020

(22) Filed: May 12, 2021

(65) Prior Publication Data
US 2021/0281853 A1 Sep. 9, 2021

Related U.S. Application Data

(63) Continuation of application No. 16/341,590, filed as application No. PCT/KR2017/011219 on Oct. 12, 2017, now Pat. No. 11,039,148.

(30) Foreign Application Priority Data

Oct. 14, 2016 (KR) .................. 10-2016-0133753
Oct. 14, 2016 (KR) .................. 10-2016-0133755
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC ..................................................... H04N 19/59
(Continued)

(56) References Cited

U.S. PATENT DOCUMENTS

2009/0232207 A1 9/2009 Chen
2013/0301715 A1 11/2013 Lin et al.
(Continued)

FOREIGN PATENT DOCUMENTS

CN 104602009 A 5/2015
JP 2013-534375 A 9/2013
(Continued)

OTHER PUBLICATIONS

Lin, Yongbing et al., "CE6.a: Report of Bidirectional UDI mode for Intra prediction", *Joint Collaborative Team on Video Coding (JCT-VC) of ITU-T SG16 WP3 and ISO/IEC JTC1/SC29 WG11*, 6th Meeting, Torino, Italy, Jul. 14-22, 2011 (pp. 1-6).
(Continued)

*Primary Examiner* — Yulin Sun
(74) *Attorney, Agent, or Firm* — NSIP Law

(57) ABSTRACT

Disclosed are an image encoding/decoding method and apparatus. The method and apparatus select at least one reference pixel line from among multiple reference pixel lines and derive a predicted value of a pixel within a current block by using the value of at least one pixel within the selected reference pixel line(s). Alternatively, the method and apparatus derive an intra prediction mode of a reconstructed pixel region on the basis of a reference pixel region of at least one reconstructed pixel region, derive an intra prediction mode of a current block on the basis of the derived intra prediction mode of the reconstructed pixel region, obtain an intra prediction block of the current block by using the derived intra prediction mode, and reconstruct
(Continued)

the current block by summing the obtained intra prediction block and a residual block of the current block.

9 Claims, 39 Drawing Sheets

(30) Foreign Application Priority Data

Sep. 29, 2017 (KR) .................. 10-2017-0127938
Sep. 29, 2017 (KR) .................. 10-2017-0127940

(51) Int. Cl.
*H04N 19/11* (2014.01)
*H04N 19/119* (2014.01)
*H04N 19/176* (2014.01)
*H04N 19/46* (2014.01)
*H04N 19/59* (2014.01)
*H04N 19/61* (2014.01)
*H04N 19/80* (2014.01)

(52) U.S. Cl.
CPC ......... *H04N 19/119* (2014.11); *H04N 19/176* (2014.11); *H04N 19/46* (2014.11); *H04N 19/59* (2014.11); *H04N 19/61* (2014.11); *H04N 19/80* (2014.11)

(58) Field of Classification Search
USPC ..................................... 375/240.13
See application file for complete search history.

(56) References Cited

U.S. PATENT DOCUMENTS

| | | | |
|---|---|---|---|
| 2014/0105473 A1* | 4/2014 | Kim | G06T 7/149 |
| | | | 382/128 |
| 2015/0358618 A1 | 12/2015 | Kim et al. | |
| 2015/0365700 A1 | 12/2015 | Kim et al. | |
| 2016/0112720 A1* | 4/2016 | Gao | H04N 19/91 |
| | | | 375/240.14 |
| 2016/0261868 A1* | 9/2016 | Chien | H04N 19/70 |
| 2016/0261882 A1 | 9/2016 | Chien et al. | |
| 2018/0160113 A1* | 6/2018 | Jeong | H04N 19/119 |
| 2019/0141318 A1* | 5/2019 | Li | H04N 19/11 |
| 2019/0200011 A1* | 6/2019 | Yoo | H04N 19/176 |

FOREIGN PATENT DOCUMENTS

| | | | |
|---|---|---|---|
| JP | 2014-503155 A | 2/2014 | |
| JP | 2014-161037 A | 9/2014 | |
| KR | 10-2008-0041972 A | 5/2008 | |
| KR | 10-2009-0097688 A | 9/2009 | |
| KR | 10-2012-0049110 A | 5/2012 | |
| KR | 10-2013-0004548 A | 1/2013 | |
| KR | 10-2014-0062454 A | 5/2014 | |
| KR | 10-2014-0124442 A | 10/2014 | |
| KR | 10-2015-0091456 A | 8/2015 | |
| WO | WO 2012/175017 A1 | 12/2012 | |
| WO | WO 2016/066093 A1 | 5/2016 | |

OTHER PUBLICATIONS

Guo, Mei et al., "CE6 Sunset d: Direction based Angular Intra Prediction", *Joint Collaborative Team on Video Coding (JCT-VC)* of ITU-T SG16 WP3 and ISO/IEC JTC1/SC29 WG11, 7$^{th}$ Meeting, Geneva, Switzerland, Nov. 21-30, 2011 (pp. 1-11).

Chang, Yao-Jen et al., "Arbitrary reference tier for intra directional modes", *Joint Video Exploration Team (JVET)* of ITU-T SG 16 WP 3 and ISO/IEC JTC 1/SC 29 WG 11, 3$^{rd}$ Meeting, Geneva, Switzerland, May 26-Jun. 1, 2016 (pp. 1-3).

Li, Jiahao, et al. "Efficient multiple-line-based intra prediction for HEVC." *IEEE Transactions on Circuits and Systems for Video Technology* 28.4 (2016): 947-957.(7 pages in English, 3 pages in Chinese).

Li, Jiahao et al., "Multiple Line-based Intra Prediction for High Efficiency Video Coding", *arXiv preprint* arXiv:1605.08308, May 26, 2016 (pp. 1-10).

International Search Report issued on Jan. 22, 2018 in counterpart International Patent Application No. PCT/KR2017/011219 (5 pages in English and 5 pages in Korean).

Kim, Hui Yong, et al. "Description of video coding technology proposal by ETRI" *Joint Collaborative Team on Video Coding (JCT-VC)* of Itu-T SG16 WP3 and ISO/IEC JTC1/SC29/WG11, 1st Meeting: Dresden, DE, Apr. 15-23, 2010 (37 pages in English).

Lai, Changcai, et al., "New intra prediction using the correlation between pixels and lines" JCTVC-B040, Joint Collaborative Team on Video Coding, 2010, (5 pages in English).

Li, Jiahao, et al., "Multiple line-based intra prediction" JVET-C0071, Joint Video Exploration Team, 2016, (6 pages in English).

Chang, Yao-Jen, et al., "EE6: Arbitrary Reference Tier for Intra Directional Modes, with Supplementary Results" JVET-D0099r2, Joint Video Exploration Team, 2016, (6 pages in English).

Li, Jianhao, et al., "EE6: Multiple line-based intra prediction" JVET-D0149, Joint Video Exploration Team, 2016, (5 pages in English).

Iwamura, Shunsuke, et al. "Direction-dependent sub-TU scan order on intra prediction" Document: JVET-B0028, Joint Video Exploration Team (JVET) of ITU-T SG 16 WP 3 and ISO/IEC JTC 1/SC 29/WG 11, 2$^{nd}$ Meeting: San Diego, USA, Feb. 20-26, 2016, (4 pages).

* cited by examiner

|  | integer-pixel position | 1/2 pixel position | 1/4 pixel position | 1/8 pixel position | 1/16 pixel position | 1/32 pixel position | sum |
|---|---|---|---|---|---|---|---|
| line 1 | 5 | 3 | 4 | 2 | 1 | 1 | 16 |
| line 2 | 2 | 4 | 5 | 1 | 1 | 3 | 16 |
| line 3 | 1 | 3 | 4 | 2 | 3 | 3 | 16 |

FIG. 19

16×16 block

16×16 block

16×16 block

METHOD AND APPARATUS FOR ENCODING/DECODING AN IMAGE

CROSS REFERENCE TO RELATED APPLICATIONS

This application is a Continuation Application of U.S. patent application Ser. No. 16/341,590, filed on Apr. 12, 2019, which is a U.S. National Stage Application of International Application No. PCT/KR2017/011219, filed on Oct. 12, 2017, which claims the benefit under 35 USC 119(a) and 365(b) of Korean Patent Application No. 10-2016-0133753, filed on Oct. 14, 2016, Korean Patent Application No. 10-2016-0133755, filed on Oct. 14, 2016, Korean Patent Application No. 10-2017-0127938, filed on Sep. 29, 2017 and Korean Patent Application No. 10-2017-0127940, filed on Sep. 29, 2017 in the Korean Intellectual Property Office, the entire disclosures of which are incorporated herein by reference for all purposes.

TECHNICAL FIELD

The present invention relates to a video signal encoding/decoding method and apparatus. More particularly, the present invention relates to an image encoding/decoding method and apparatus using improved intra prediction.

BACKGROUND ART

In recent years, demand for multimedia data such as video has been rapidly increasing on the Internet. However, it is hard for development of technology for improving channel bandwidths to keep up with the rapid changes in the demand for multimedia data. In order to solve this problem, VCEG (Video Coding Expert Group) of ITU-T which is the internal organization for standard and MPEG (Moving Picture Expert Group) of ISO/IEC are continuously collaborating to establish improved video compression standards.

Video compression consists largely of intra prediction, inter prediction, transform, quantization, entropy coding, and in-loop filtering. Among them, intra prediction is a technique of generating a prediction block for a current block by using reconstructed pixels existing around the current block.

Conventional intra prediction generates pixels at sub-pixel positions through an interpolation process on the basis of reference pixels at integer-pixel positions, and generates prediction blocks using the pixels at the generated sub-pixel positions. In this case, depending on which integer-position reference pixel is used and which interpolation scheme is applied, the error between the original pixel value and the predicted pixel value is affected.

In addition, the conventional intra prediction technique needs to encode a significant amount of information about prediction modes in order to inform a video decoding apparatus that which intra prediction mode among multiple intra prediction modes is used for intra prediction of an input image.

DISCLOSURE

Technical Problem

An object of the present invention is to improve intra prediction efficiency in an image encoding or decoding process by performing intra prediction with the use of multiple reference pixel lines, in encoding or decoding an image.

Another object of the present invention is to improve intra prediction efficiency in an image encoding or decoding process by generating an intra prediction block with the use of an interpolation scheme adaptively selected from among multiple interpolation schemes.

A further object of the present invention is to provide a filtering method capable of reducing discontinuity between an intra prediction block and a surrounding region when intra prediction is performed using multiple reference pixel lines, in an image encoding or decoding process.

A yet further object of the present invention is to improve intra picture prediction efficiency in an image encoding or decoding process by deriving an intra prediction mode used to encode or decode an image by using an already reconstructed pixel region.

Technical Solution

According to an embodiment of the present invention, an image decoding method and apparatus may select at least one reference pixel line from among multiple reference pixel lines and derives a predicted value of a pixel within a current block by using a value of at least one pixel within the selected reference pixel line(s).

According to an embodiment of the present invention, the image decoding method and apparatus may obtain reference pixel line index information from an input bitstream and select the at least one reference pixel line from the multiple reference pixel lines on the basis of the reference pixel line index information.

According to an embodiment of the present invention, the image decoding method and apparatus may select at least one reference pixel line for each pixel within the current block on the basis of a position of a corresponding one of the pixels within the current block.

According to an embodiment of the present invention, the image decoding method and apparatus may select an interpolation scheme from among multiple interpolation schemes and perform interpolation with at least one pixel included in the at least one reference pixel line that is selected by using the selected interpolation scheme, thereby obtaining the predicted value. The selected interpolation scheme may be selected on the basis of index information indicating one of the multiple interpolation schemes.

According to an embodiment of the present invention, the image decoding method and apparatus may obtain a prediction block by deriving the predicted values of all the pixels within the current block and filter the prediction block.

According to an embodiment of the present invention, the image decoding method and apparatus may filter a predetermined region of the current block, depending on a size of the current block or an intra prediction mode of the current block.

According to an embodiment of the present invention, an image encoding method and apparatus may select at least one reference pixel line from among multiple reference pixel lines and derive a predicted value of a pixel within a current block by using a value of at least one pixel within the selected reference pixel line(s).

According to an embodiment of the present invention, the image encoding method and apparatus may encode reference pixel line index information indicating the at least one pixel line that is selected and insert the encoded reference pixel line index information into a bitstream.

According to an embodiment of the present invention, the image encoding method and apparatus may select at least one reference pixel line for each pixel within the current block on the basis of a position of a corresponding one of the pixels within the current block.

According to an embodiment of the present invention, the image encoding method and apparatus may select at least one reference pixel line for each pixel within the current block on the basis of an intra prediction mode of the current block.

According to an embodiment of the present invention, the image encoding method and apparatus may select an interpolation scheme from among multiple interpolation schemes and perform interpolation with at least one pixel included in the at least one reference pixel line that is selected by using the selected interpolation scheme, thereby obtaining the predicted value.

According to an embodiment of the present invention, the image encoding method and apparatus may encode index information indicating one of the multiple interpolation schemes and insert the encoded index information into a bitstream.

According to an embodiment of the present invention, the image encoding method and apparatus may obtain a prediction block by deriving the predicted values of all the pixels within the current block and filter the prediction block.

According to an embodiment of the present invention, the image encoding method and apparatus may filter a predetermined region of the current block, depending on a size of the current block or an intra prediction mode of the current block.

According to an embodiment of the present invention, an image encoding/decoding method and apparatus derives an intra prediction mode of a reconstructed pixel region on the basis of a reference pixel region of at least one reconstructed pixel region, derives an intra prediction mode of a current block on the basis of the derived intra prediction mode of the reconstructed pixel region, obtains an intra prediction block of the current block by using the derived intra prediction mode, and reconstructs the current block by summing the obtained intra prediction block and a residual block of the current block.

According to an embodiment of the present invention, the image decoding method and apparatus may obtain information indicating an intra prediction mode derivation method from an input bitstream and determine whether to derive an intra prediction mode of a reconstructed pixel region according to the obtained information indicating the intra prediction mode derivation method.

According to an embodiment of the present invention, the image decoding method and apparatus may obtain available intra prediction mode information indicating the number of multiple available intra prediction modes or a list of the multiple available intra prediction modes and derive the intra prediction mode of the current block on the basis of the available intra prediction mode information.

According to an embodiment of the present invention, the image encoding method and apparatus may encode information indicating an intra prediction mode derivation method for a current block and insert the encoded information into a bitstream, and the image decoding method and apparatus may selectively perform derivation of an intra prediction mode of a reconstructed pixel region according to the information indicating the intra prediction mode derivation method for the current block.

Advantageous Effects

According to the present invention, it is possible to improve the compression efficiency of an image and the image quality of a reproduced image by using a more effective intra prediction technique. According to the present invention, it is possible to improve the image quality of a reproduced image by using a filtering method capable of reducing discontinuity between an intra prediction block and the surrounding area.

DESCRIPTION OF DRAWINGS

FIGS. 18 and 19 are diagrams illustrating a method of determining a reference pixel line without transmitting a reference pixel line index;

BEST MODE

Figure 1:
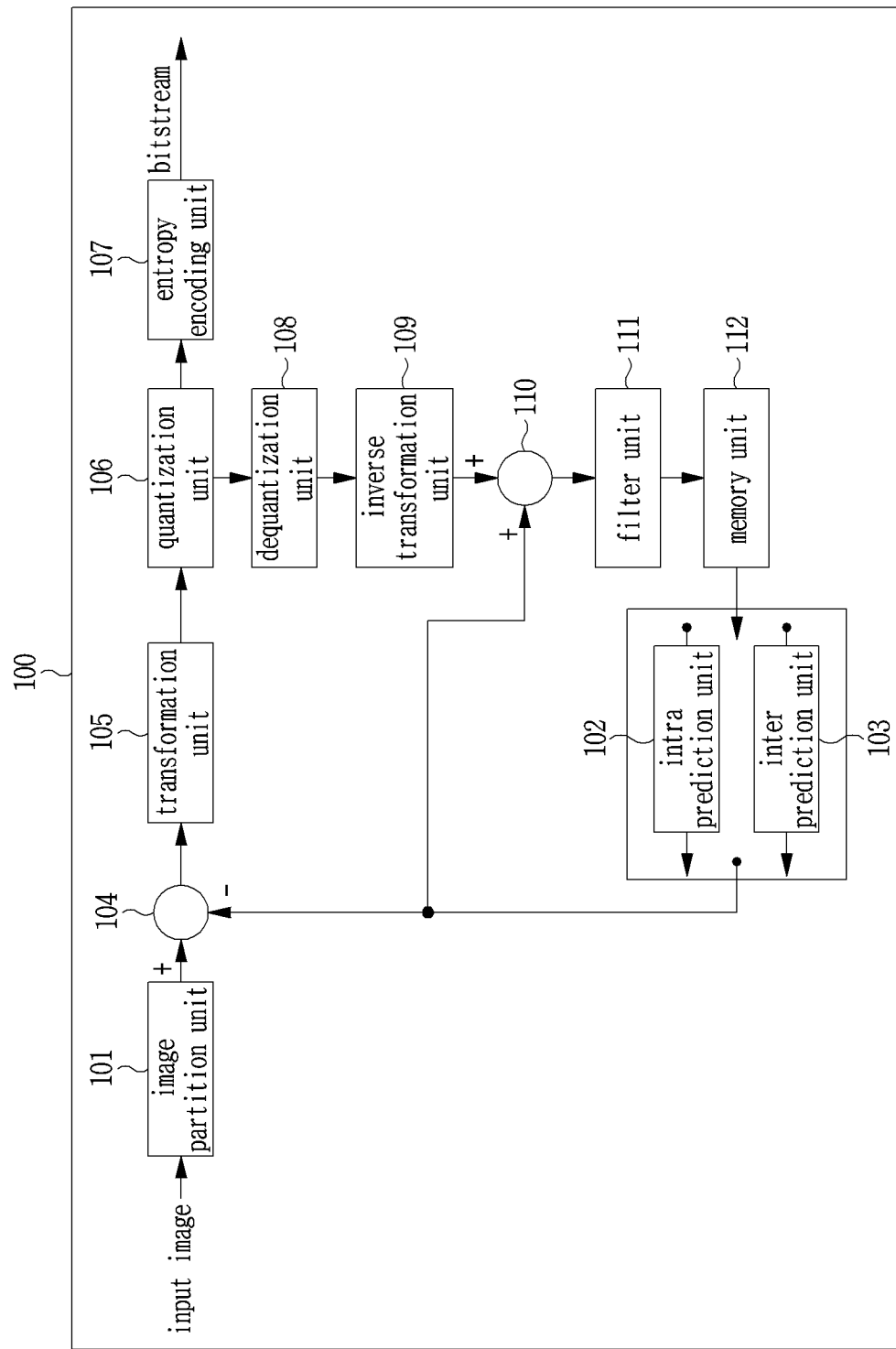
FIG. 1 is a block diagram illustrating an image encoding apparatus according to one embodiment of the present invention.

The present invention may be embodied in many forms and have various embodiments. Thus, specific embodiments will be illustrated in the accompanying drawings and described in detail below. While specific embodiments of the invention will be described herein below, they are only illustrative purposes and should not be construed as limiting to the present invention. Accordingly, the present invention should be construed to cover not only the specific embodiments but also cover all modifications, equivalents, and substitutions that fall within the sprit and technical scope of the present invention. Throughout the drawings, like elements are denoted by like reference numerals.

Terms used in the specification, "first", "second", etc., may be used to describe various components, but the components are not to be construed as being limited to the terms. That is, the terms are used to distinguish one component from another component. For example, a first constitutive element may be referred as a second constitutive element, and the second constitutive element may be also referred to as the first constitutive element. Moreover, the term "and/or" includes any and all combinations of one or more of the associated listed items.

It will be understood that when any element is referred to as being "connected" or "connected" to another element, one element may be directly connected or coupled to the other element, or an intervening element may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a", "an" and "the" are intended to include the plural forms as well unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof.

Hereinafter, exemplary embodiments of the present invention will be described in detail with reference to the accompanying drawings. Hereinafter, like constituent elements are denoted by like reference numerals throughout the drawings, and redundant explanations for the same constituent elements will be omitted.

FIG. 1 is a block diagram illustrating an image encoding apparatus according to one embodiment of the present invention.

Referring to FIG. 1, an image encoding apparatus 100 includes an image partition unit 101, an intra prediction unit 102, an inter prediction unit 103, a subtractor 104, a transformation unit 105, a quantization unit 106, an entropy encoding unit 107, a dequantization unit 108, an inverse transformation unit 109, an adder 110, a filter unit 111, and a memory unit 112.

In addition, components described in exemplary embodiments of the present invention are independently shown only in order to indicate that they perform different characteristic functions in an image encoding apparatus. Therefore, the components that are independently shown do not mean that each of the components is implemented as one piece of hardware or software. That is, each of the components is divided for convenience of explanation, multiple components may be combined with each other to thereby be operated as one component or one component may be divided into a plurality components to thereby be operated as the multiple components, which are included in the scope of the present invention as long as it departs from essential characteristics of the present invention.

In addition, some of components may not be indispensable components performing essential functions of the present invention, but be selective components improving only performance thereof. The present invention may also be implemented only by a structure including the indispensable components except for the selective components, and the structure including only the indispensable components is also included in the scope of the present invention.

The image partition unit 100 partitions an input image into at least one block. The input image may have various shapes and sizes such as a picture, a slice, a tile, and a segment. A block means a coding unit (CU), a prediction unit (PU), or a transform unit (TU). The partitioning is performed based on at least one of a quadtree and a binary tree. The quad tree is a method of dividing an upper layer block into smaller lower layer blocks with a width and a height that are half the upper layer block. The binary tree is a method of dividing an upper layer block into lower layer blocks, either width or height of which is half the upper layer block. Through the binary tree partitioning described above, square or non-square blocks can be generated.

Hereinafter, in the embodiment of the present invention, a coding unit is used as a basic unit for performing coding, or as a basic unit for performing decoding.

A predicting unit 102 and 103 is divided into an inter predicting unit 103 for performing inter prediction and an intra predicting unit 102 for performing intra prediction. Whether to perform inter prediction or intra prediction is determined first for each prediction unit which is the basic unit for prediction, and specific information (e.g., intra prediction mode, motion vector, reference picture, etc.) associated with each of the prediction methods are also determined. The basic unit by which prediction is performed can differ from the basic unit by which a prediction method is determined or the basic unit by which detailed information for prediction is determined. For example, determination of a prediction method and a prediction mode is performed a per prediction unit basis but execution of prediction is performed on a per transform unit basis.

A residual value (residual block) between a generated prediction block which is the block generated through prediction and an original block is input to the transformation unit 105. In addition, prediction mode information, motion vector information, and the like used for prediction are encoded by the entropy encoding unit 107, and the coded information and the residual value are transmitted together to a decoder. When a particular coding mode is used, the original block can be coded as it is without generating a prediction block by using the prediction units 102 and 103, and the resulting coded block can be transmitted to the decoder.

The intra prediction unit 102 determines an intra prediction mode used for performing prediction on a current block and generates one or multiple prediction blocks using reference pixels according to the determined intra prediction mode. When the prediction mode of a neighboring block of the current block to undergo intra prediction is a prediction mode for inter prediction, a reference pixel included in the neighboring block which has undergone inter prediction is replaced with a reference pixel included in another neighboring block which has undergone intra prediction. That is, when one or more reference pixels within a specific neighboring lock are not available, information on these reference pixels are replaced with information on at least one reference pixel of available reference pixels.

For intra prediction, there are directional prediction modes and non-directional prediction modes. In the directional prediction modes, reference pixel information selected according to direction information is used for prediction. In contrast, in the non-directional prediction modes, direction information is not used for prediction. The mode for predicting luminance information can be the same or be different from the mode for predicting chrominance information. For prediction of chrominance information, intra prediction mode information which has been used for prediction of luminance information, or predicted luminance signal information can be used.

The intra prediction unit 102 includes an adaptive Intra smoothing (AIS) filter, a reference pixel interpolator, and a DC filter. The AIS filter is a filter for filtering the reference pixels of the current block. Whether to apply a filter is adaptively determined depending on the prediction mode of a current prediction unit. When the prediction mode of the current block is a mode in which AIS filtering is not performed, the AIS filter is not used.

When the intra prediction mode of a prediction unit is a prediction mode in which intra prediction is performed by using pixel values generated through interpolation of reference pixels, the reference pixel interpolator of the intra prediction unit 102 generates reference pixels for sub-pixel positions by interpolating the reference pixels. The reference pixels are not interpolated when the prediction mode of the current prediction unit is a prediction mode in which a prediction block is generated without interpolation of reference pixels. The DC filter generates a prediction block by filtering reference pixels when the prediction mode of the current block is DC mode.

A residual block including residual information that is a difference value between the prediction block generated by the prediction unit 102 and 103 and the original block can be generated. The generated residual block is input to the transformation unit 105 so as to be transformed.

Figure 2:
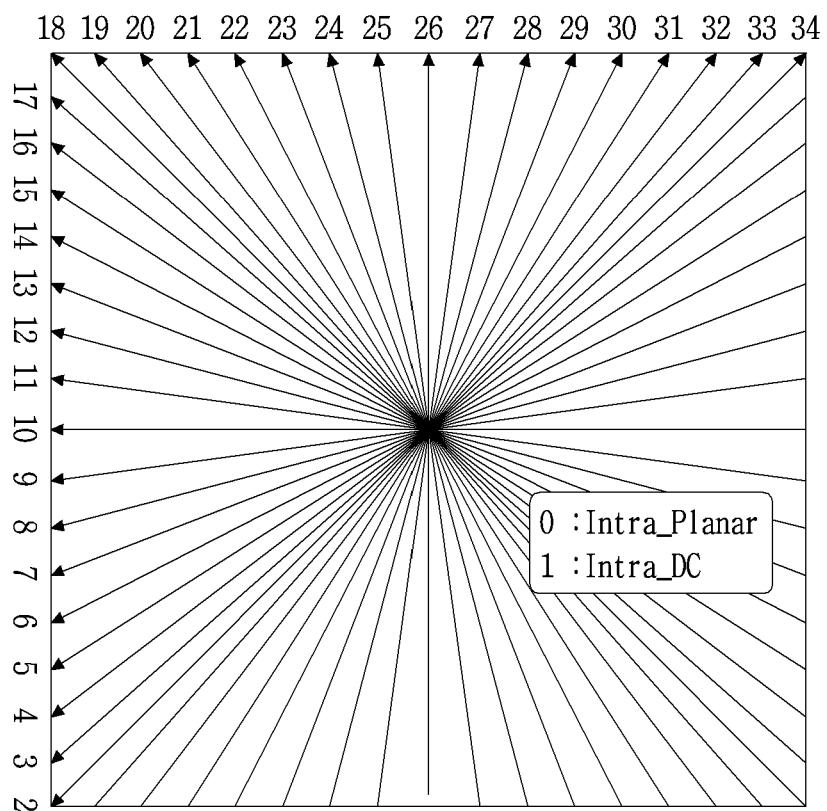
FIG. 2 is a diagram illustrating an example of an intra prediction mode.

FIG. 2 is a diagram illustrating an example of an intra prediction mode. Referring to FIG. 2, there are a total of 35 modes for intra prediction. Mode 0 represents the planar mode, Mode 1 represents the DC mode, and Mode 2 through Mode 34 represent angular modes.

Figure 3:
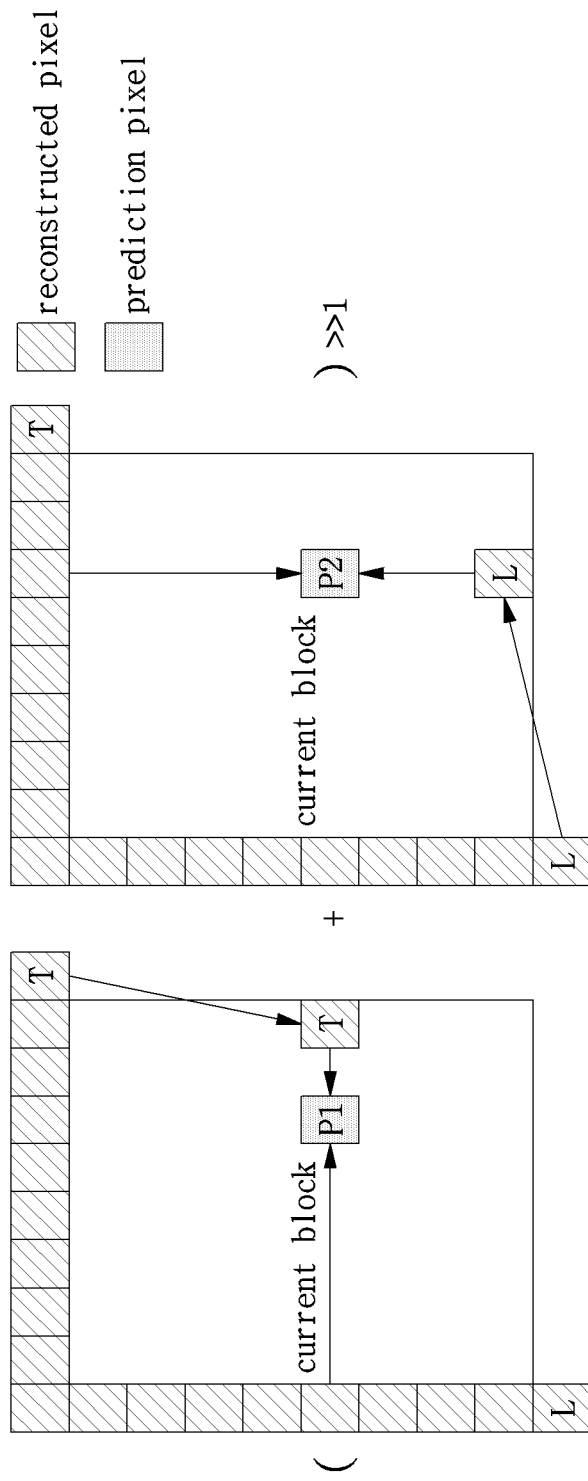
FIG. 3 is a diagram illustrating a planar mode.

FIG. 3 is a diagram illustrating the planar mode. The predicted pixel value (hereinafter, referred to as prediction pixel) of a first pixel P1 within the current block is generated by interpolating the pixel value of the reconstructed pixel at the same position in the Y axis as the first pixel P1 and the pixel value of the reconstructed pixel T at the upper right position with respect to the current block. Similarly, the predicted pixel value (hereinafter, referred to as prediction pixel) of a second pixel P2 within the current block is generated by performing linear interpolation using the reconstructed pixel at the same position in the X axis as the second pixel P2 and the reconstructed pixel L at the lower left position with respect to the current block. A value obtained by averaging two prediction pixels P1 and P2 is a final prediction pixel. In the planar mode, a prediction block of the current block is generated by deriving prediction pixels in the same manner as described above.

Figure 4:
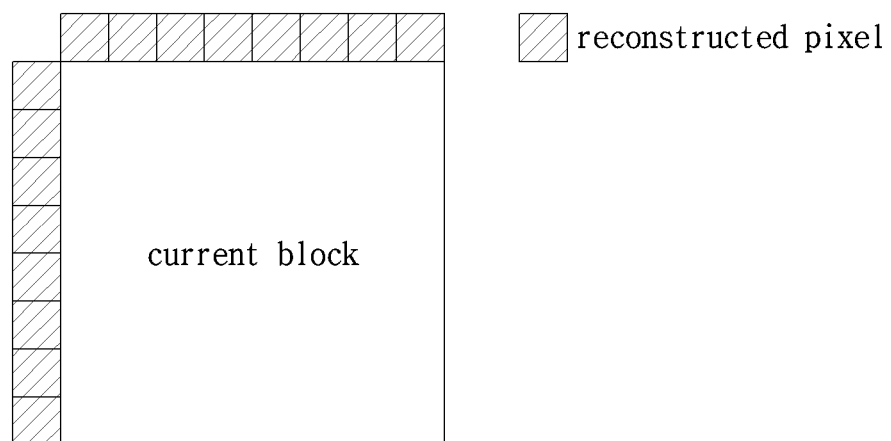
FIG. 4 is a diagram illustrating a DC mode.

FIG. 4 is a diagram illustrating the DC mode. The average of the reconstructed pixels around the current block is first calculated. The average is used as the predicted pixel value of each pixel within the current block.

Figure 5:
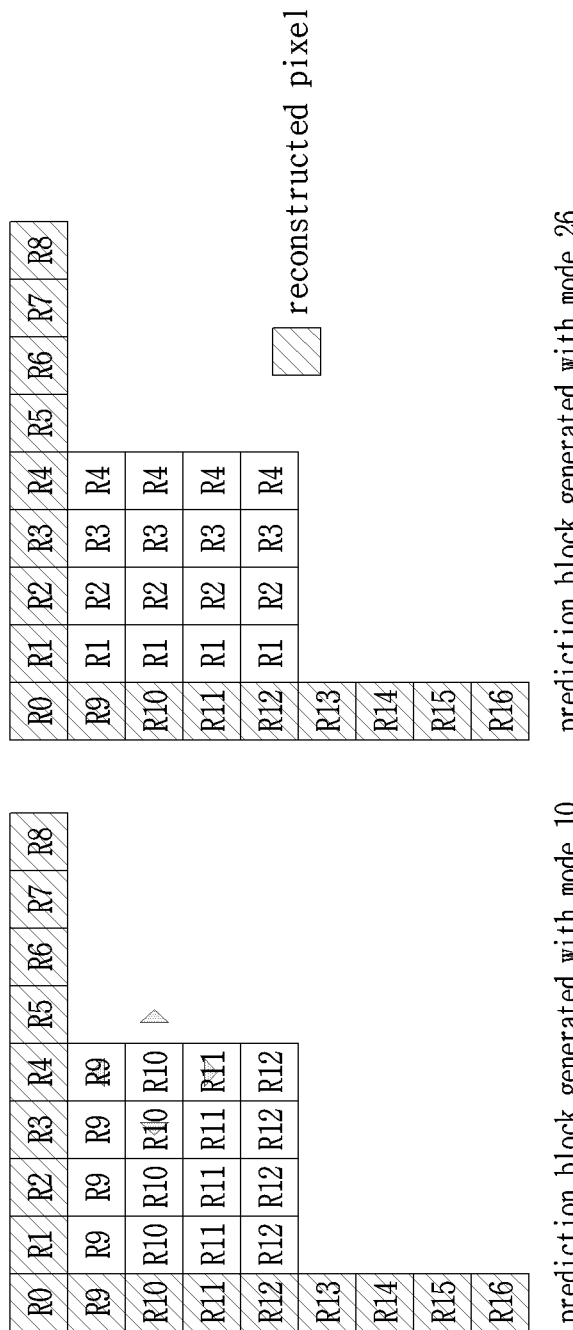
FIG. 5 is a diagram illustrating an example of a method of generating a prediction block.

FIG. 5 is a diagram illustrating an example of a method of generating a prediction block using Mode 10 (horizontal mode) and Mode 26 (vertical mode). In the case of using Mode 10, the pixel values of the reference pixels adjacent to the left side of the current block are copied to their right-side pixels within the current block, thereby generating a prediction block of the current block. Similarly, in the case of using Mode 26, the pixel values of the reference pixels adjacent to the upper side of the current block are copied downward to their lower-side pixels, thereby generating a prediction block of the current block.

Referring to FIG. 1, the inter prediction unit 103 generates a prediction unit on the basis of information on the previous picture, the subsequent picture, or both of a current picture. In some cases, the prediction unit is generated on the basis of information on a local region within a picture. The inter prediction unit 103 includes a reference picture interpolator, a motion prediction unit, and a motion compensation unit.

The reference picture interpolator receives reference picture information from the memory unit 112 and generates pixel information on integer pixels or sub-pixels from a reference picture. For a luminance pixel, a DCT-based interpolation 8-tap filter having different filter coefficients is used to generate pixel information on sub-pixels on a per ¼-pixel basis. For a chrominance pixel, a DCT-based interpolation 4-tap filter having different filter coefficients is used to generate pixel information on sub-pixels on a per ⅛-pixel basis.

The motion prediction unit performs motion prediction on the basis of a reference picture that is generated through interpolation by the reference picture interpolator. Various methods such as Full Search-based Block Matching Algorithm (FBMA), Three Step Search (TSS), and New Three- Step Search Algorithm (NTS) can be used to calculate motion vectors. The motion vector has a motion vector value per ½-pixel or ¼-pixel, which is generated on the basis of sub-pixels generated through the interpolation. The motion prediction unit performs prediction on a current prediction unit by switching motion prediction methods. Various motion prediction methods such as a skip method, a merge method, and an advanced motion vector prediction (AMVP) method can be used.

The subtractor 104 generates a residual block of the current block by calculating a difference between the current block to be coded and the prediction block generated by the intra prediction unit 102 or the inter prediction unit 103.

The transformation unit 105 transforms the residual block including residual data by using a conversion transform method such as DCT, DST, Karhunen Loeve Transform (KLT), or the like. In this case, a transform method to be used is determined depending on the intra prediction mode of the prediction unit that has been used to generate the residual block. For example, depending on the intra prediction mode, DCT and DST may be used for the horizontal direction and the vertical direction, respectively.

The quantization unit 106 quantizes the values transformed into the frequency domain by the transformation unit 105. The quantization coefficient varies depending on the block or the importance of the image. The values calculated by the quantization unit 106 are fed to the dequantization unit 108 and the entropy encoding unit 107.

The transformation unit 105, the quantization unit 106, or both are included in the image encoding apparatus 100. That is, the image encoding apparatus 100 encodes the residual block by performing transform, quantization, or both on the residual data of the residual block, or by skipping both the transform and the quantization. A block that is fed to the entropy encoding unit 107 is generally referred to as a transform block even though either the transform or the quantization is not performed in the image encoding apparatus 100, or neither the transform nor the quantization is performed in the image encoding apparatus 100. The entropy encoding unit 107 entropy-encodes input data. For entropy encoding, various encoding methods such as exponential-Golomb, context-adaptive variable length coding (CAVLC) and context-adaptive binary arithmetic coding (CABAC) can be used.

The entropy encoding unit 107 receives from the prediction unit 102 and 103 various kinds of information such as residual coefficient information and block type information for each coding unit, prediction mode information, partition unit information, prediction unit information, transmission unit information, motion vector information, reference frame information, block interpolation information, filtering information, and the like, and encodes the received information. A transform block coefficient is determined for each partial block within a transform block. The entropy encoding unit 107 encodes a coefficient having a value other than 0, a coefficient having an absolute value greater than 1 or 2, and various kinds of flag indicating the signs of the coefficients. The coefficient that is not to be encoded with only a flag can be encoded with the absolute value of the difference between an actual transform block coefficient and a coefficient that is encoded with a flag. The dequantization unit 108 dequantizes the values quantized by the quantization unit 106 and the inverse transformation unit 109 inversely transforms the values transformed by the transformation unit 105. A residual generated by the dequantization unit 108 and the inverse transformation unit 109 is added to a prediction unit that is generated through operations of the motion estimator, the motion compensation unit, and the intra prediction unit 102 of the prediction unit 102 and 103. Thus, a reconstructed block is generated. The adder 110 generates a reconstruction block by summing a prediction block generated by the predicting unit 102 and 103 and a residual block generated by the inverse transform unit 109.

The filter unit 111 include at least one of a deblocking filter, an offset compensation unit, and an adaptive loop filter (ALF).

The deblocking filter removes block artifacts caused by the boundary between blocks within a reconstructed picture. When determining whether to perform deblocking, pixels within several rows or columns within a block are used for the determination. When it is determined that a deblocking filter is to be applied to a block, a strong filter or a weak filter may be used according to a deblocking filtering strength required. When performing horizontal filtering and vertical filtering while using a deblocking filter, the vertical filtering and the horizontal filtering can be performed in parallel.

The offset compensation unit compensates the offset between the deblocked image and the original image on a per pixel basis. In order to perform offset compensation for a specific picture, pixels included in the specific picture are divided into a predetermined number of regions, a region to undergo offset compensation is then determined, and an offset compensation is performed on the determined region. Alternatively, an offset compensation may be applied according to edge information of each pixel.

Adaptive loop filtering (ALF) can be performed on the basis of a comparison result between the filtered reconstructed image and the original image. Filtering can be differently performed depending on a pixel group. That is, pixels within an image are divided into a predetermined number of pixel groups, filters to be used for the respective pixel groups are determined, and filtering is differently performed on each pixel group. The information indicating whether to apply the ALF is transmitted per coding unit (CU). The shape and the filter coefficient of the ALF filter to be used may differ for each block. Alternatively, the same type (fixed form) of ALF filter may be used, regardless of the characteristics of target blocks to be filtered.

The memory unit 112 stores reconstructed blocks or reconstructed pictures output from the filter unit 111 and the reconstructed blocks or pictures stored therein are fed to the prediction unit 102 and 103 when the inter prediction is performed.

Figure 6:
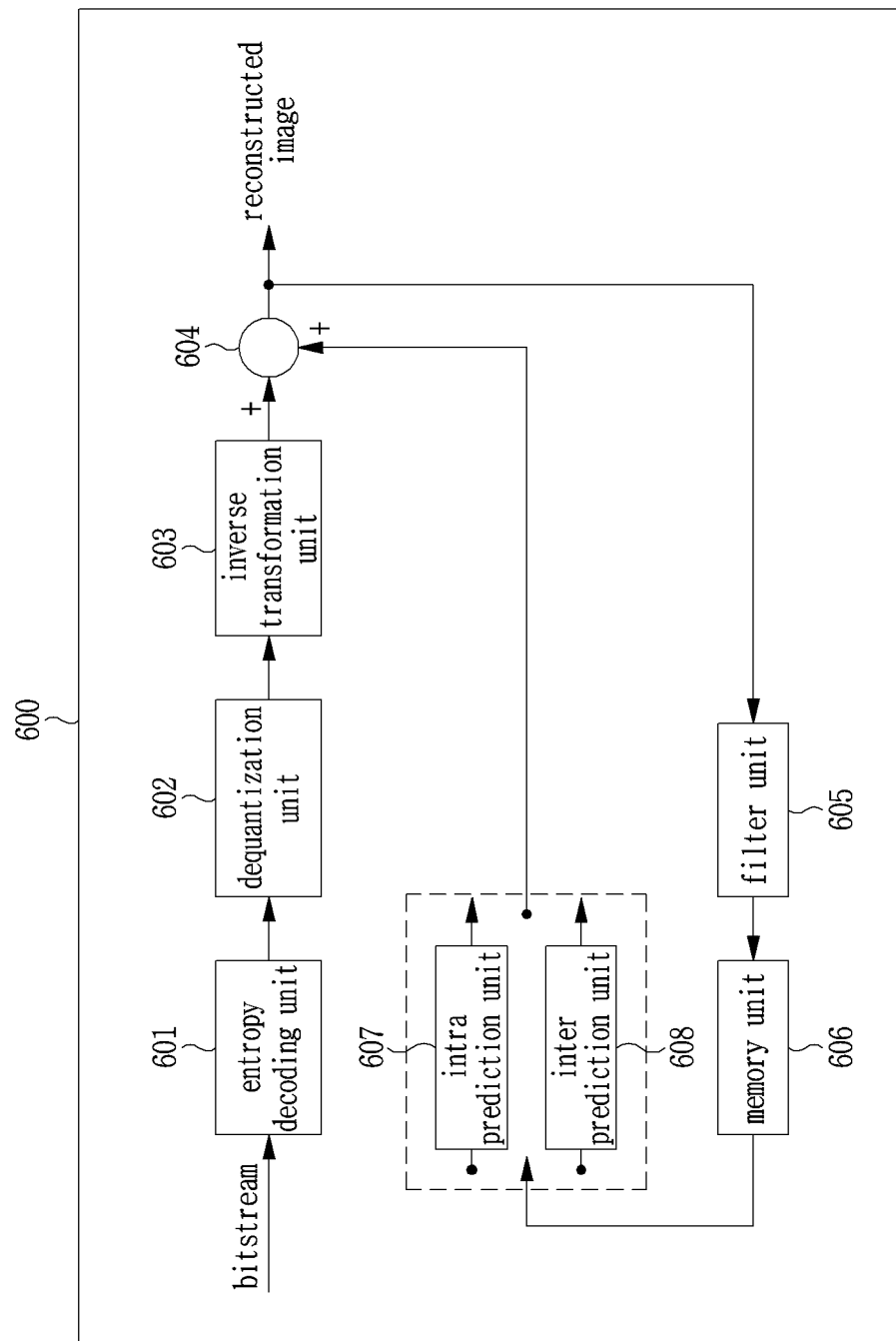
FIG. 6 is a block diagram illustrating an image decoding apparatus according to one embodiment of the present invention.

FIG. 6 is a block diagram illustrating an image encoding apparatus 600 according to an embodiment of the present invention.

Referring to FIG. 6, the image decoding apparatus 600 includes an entropy decoding unit 601, a dequantization unit 602, an inverse transformation unit 603, an adder 604, a filter unit 605, a memory unit 606, and a prediction unit 607 and 608.

When an image bitstream generated by the image encoding apparatus 100 is input to the image decoding apparatus 600, the input bitstream is decoded according to the reverse operation procedure by the image decoding apparatus 600.

The entropy decoding unit 601 perform entropy decoding in the reverse procedure to the procedure performed by the entropy encoding unit 107 of the image encoding apparatus 100. For example, various methods such as exponential-Golomb, context-adaptive variable length coding (CAVLC) and context-adaptive binary arithmetic coding (CABAC) can be used according to the method used in the image encoding apparatus. A transform block coefficient is determined for each partial block within a transform block. The entropy decoding unit 601 decodes a coefficient having a value other than 0, a coefficient having an absolute value greater than 1 or 2, and various kinds of flags based the signs of the coefficients. A coefficient that is not represented only by the flag is decoded by summing a coefficient represented by a flag and a signaled coefficient.

The entropy decoding unit 601 can decode information associated the intra prediction and the inter prediction performed in the encoder. The dequantization unit 602 performs dequantization on the quantized transform block to generate a transform block. The dequantization unit 602 operates in the substantially same manner as the dequantization unit 108 of FIG. 1.

The inverse transformation unit 603 performs inverse transform on the transform block to generate a residual block. In this case, the transform method is determined depending on information indicating a prediction method (whether it is inter prediction or intra prediction), the size and/or shape of a block, an intra prediction mode, and the like. The inverse transformation unit 603 operates in the substantially same manner as the inverse transformation unit 109 of FIG. 1.

The adder 604 generates a reconstruction block by summing a prediction block generated by the predicting unit 607 and 608 and a residual block generated by the inverse transformation unit 603. The adder 604 operates in the substantially same manner as the adder 110 of FIG. 1.

The filter unit 605 reduces various types of noise occurring in the reconstructed blocks.

The filter unit 605 includes a deblocking filter, an offset compensation unit, and an ALF.

Information on whether or not a deblocking filter has been applied to the corresponding block or picture is received from the image encoding apparatus 100. When a deblocking filter is applied, information on whether a strong filter or a weak filter is applied is received from the image encoding apparatus. The deblocking filter of the image decoding apparatus 600 receives information on the used deblocking filter from the image encoding apparatus 100. The deblocking filter of the image decoding apparatus 600 performs deblocking filtering on the target block on the basis of the received information.

The offset compensation unit performs offset compensation on a reconstructed image on the basis of the offset compensation type and the offset value that have been used for image encoding.

The ALF is applied or not applied to a coding unit according to ALF application information indicating whether an ALF is applied during encoding, ALF coefficient information, and the like, which are provided by the image encoding apparatus 100. Such ALF information is included in a specific parameter set. The filter unit 605 operates in the substantially same manner as the filter unit 111 of FIG. 1.

The memory unit 606 stores the reconstructed block generated by the adder 604. The memory unit 606 operates in the substantially same manner as the memory unit 112 of FIG. 1.

The prediction unit 607 and 608 generates a prediction block on the basis of information associated with prediction block generation provided by the entropy decoding unit 601 and information on the previously decoded block or picture provided by the memory unit 606.

The prediction unit 607 and 608 includes an intra prediction unit 607 and an inter prediction unit 608. Although not illustrated in the drawings, the prediction unit 607 and 608 may further include a prediction-unit determination unit. The prediction-unit determination unit receives various information such as prediction unit information input from the entropy decoding unit 601, prediction mode information of the intra prediction method, and motion prediction information of the inter prediction method. The prediction-unit determination unit identifies the prediction unit of the current coding unit and determines whether the prediction unit is to be inter-predicted or intra-predicted. The inter prediction unit 608 performs inter prediction on the current prediction unit by using information required for inter prediction of the current prediction unit, which is provided by the image encoding apparatus 100, on the basis of information included within the previous picture or the subsequent picture to the current picture in which the present prediction unit is included. Alternatively, inter prediction may be performed on the basis of information of a partial region of a previously reconstructed region within the current picture in which the current prediction unit is included.

In order to perform the inter prediction, for each coding unit, it is determined which motion prediction mode from among a skip mode, a merge mode, and an AMVP mode is used as a motion prediction mode of a prediction unit included in a corresponding one of the coding units.

The intra prediction unit 607 generates a prediction block using reconstructed pixels located near the current block to be encoded.

The intra prediction unit 607 includes an adaptive Intra smoothing (AIS) filter, a reference pixel interpolator, and a DC filter. The AIS filter is a filter for filtering the reference pixels of the current block. Whether to apply a filter is adaptively determined depending on the prediction mode of a current prediction unit. AIS filtering is performed on reference pixels of the current block by using a prediction mode of a prediction unit and AIS filter information provided by the image encoding apparatus 100. When the prediction mode of the current block is a mode in which the AIS filtering is not performed, an AIS filter is not used.

When a prediction mode of a prediction unit is a mode in which intra prediction is performed on the basis of a pixel value obtained by interpolating reference pixels, the reference pixel interpolator of the intra prediction unit 607 interpolates the reference pixels, thereby generating "reference pixels at sub-pixel positions" (hereinafter, referred to as sub-pixel-position reference pixels). The generated sub-pixel-position reference pixels can be used as prediction pixels of the pixels within the current block. When the prediction mode of the current prediction unit is a prediction mode in which a prediction block is generated without interpolating reference pixels, the reference pixels are not interpolated. The DC filter generates a prediction block by filtering reference pixels when the prediction mode of the current block is DC mode.

The intra prediction unit 607 operates substantially in the same manner as the intra prediction unit 102 of FIG. 1.

The inter prediction unit 608 generates an inter prediction block by using the reference picture and the motion information stored in the memory unit 606. The inter prediction unit 608 operates substantially in the same manner as the inter prediction unit 103 of FIG. 1.

The present invention particularly relates to intra prediction. Hereinafter, various embodiments of the present invention will be described in greater detail below with reference to the accompanying drawings.

<Interpolation for Intra Prediction>

Figure 7A:
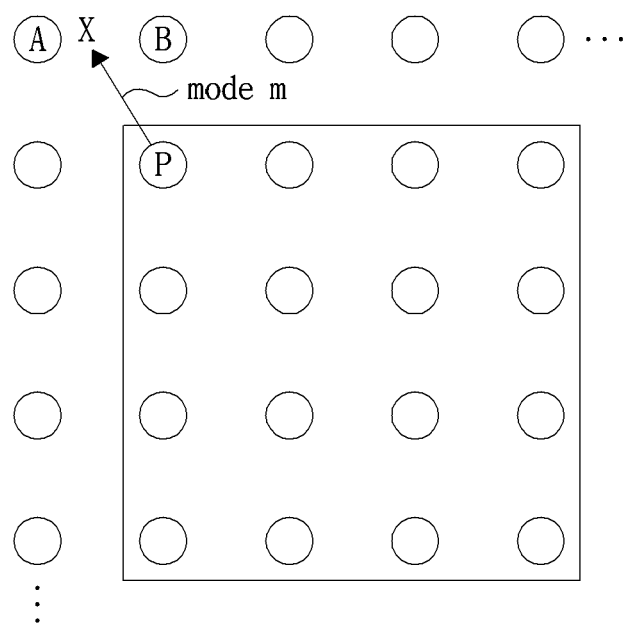
FIGS. 7A and 7B are diagrams illustrating a method of generating an intra prediction pixel by using an interpolation scheme.
Figure 7B:
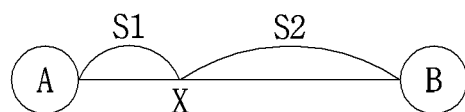

FIGS. 7A and 7B are diagrams illustrating a method of generating an intra prediction pixel by using an interpolation scheme; Assuming that the prediction angle of a mode m (mode number is m), which is one of the intra prediction modes illustrated in FIG. 2, is the same as shown in FIG. 7A, when intra prediction is performed using the mode m, a reference pixel X to be used for prediction is not located at an integer pixel position. Therefore, interpolation is performed using reference pixels A and B located at integer pixel positions on the left side and the right side of the reference pixel X, and the reference pixel X at a sub-pixel position is generated. The generated reference pixel X is used as a prediction pixel at a position P within the current block.

FIG. 7B is a diagram illustrating a relationship among the pixels X, A, and B. Referring to FIG. 7B, the distance between the pixels X and A is S1, and the distance between the pixels B and X is S2. The pixel X can be derived using one of various interpolation schemes, selected depending on the ratio of the distances S1 and S2. Various interpolation schemes such as linear interpolation, cubic convolution interpolation, and B-spline interpolation can be used for interpolation.

There are various methods of enabling the image decoding apparatus 600 to be aware of which interpolation scheme is used from among multiple interpolation schemes or which interpolation coefficient set is used. A first method is a method in which the image encoding apparatus 100 transmits index information indicating which interpolation scheme among multiple available interpolation schemes is used to the image decoding apparatus 600. In this case, the image encoding apparatus 100 can set the index information indicating the interpolation scheme by using a block header or an upper layer header. Here, setting the index information by using the upper layer header means that the header of a unit larger than a block, for example, a slice segment header, a picture parameter set, or a sequence parameter set is used. The index information indicating the interpolation scheme included in the upper layer header is encoded by the image encoding apparatus 100 and the encoded index information is transmitted to the image decoding apparatus 600.

Alternatively, the image encoding apparatus 100 and the image decoding apparatus 600 store the same predetermined multiple interpolation coefficient sets, and interpolation coefficient index information indicating which set is selected and used for encoding is notified to the image decoding apparatus 600 via the upper layer header.

Alternatively, instead of the method in which the image encoding apparatus 100 transmits index information indicating which interpolation scheme is used or interpolation coefficient index information indicating which interpolation coefficient set is used to the image decoding apparatus 600, a different method can be used in which the image encoding apparatus 100 and the image decoding apparatus 600 derive the same interpolation coefficient set implicitly.

Specifically, the image encoding apparatus 100 and the image decoding apparatus 600 can derive the same interpolation coefficient set in the same manner by using previously reconstructed pixels. For example, one interpolation filter is used to increase R reference pixels that are reconstructed pixels by K times (i.e., increased to R×K reference pixels) where K is an arbitrary real number, or decrease the R reference pixels by 1/K times. Then, the original R reference pixels are restored through the reverse process using the same interpolation filter. The optimal interpolation filter is determined according to the differences between the values of the R reconstructed reference pixels and the values of the original reference pixels.

Figure 8:
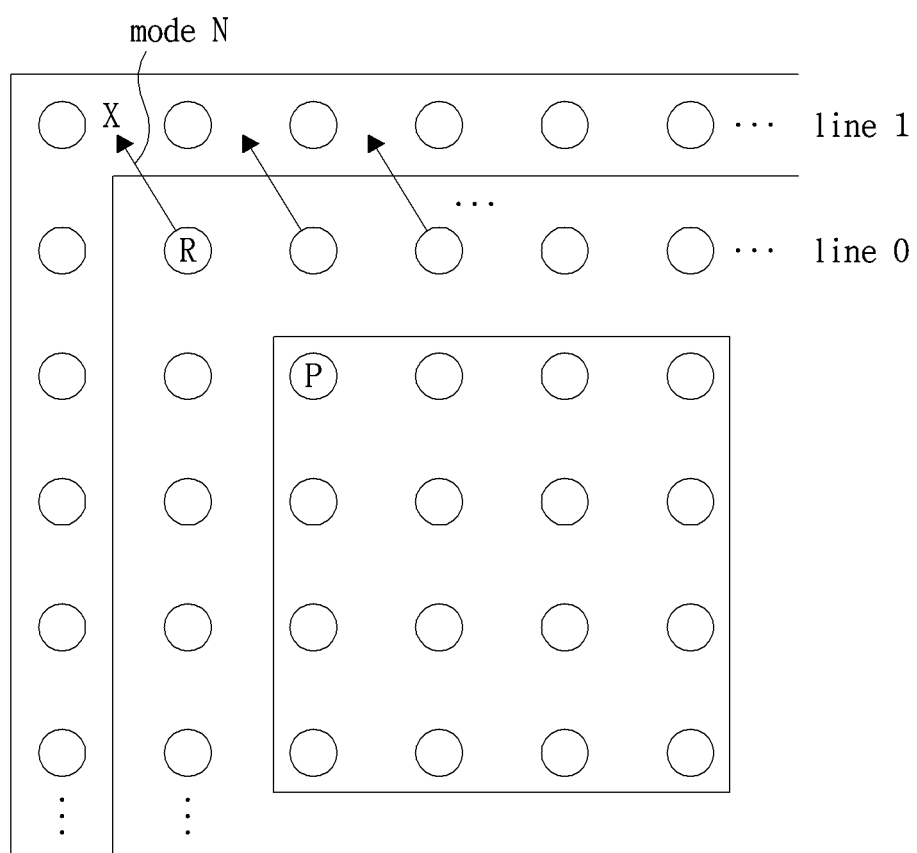
FIG. 8 is a diagram illustrating an implicit method for selecting an interpolation scheme or interpolation coefficients.

FIG. 8 is a diagram illustrating another method of selecting an interpolation scheme and/or an interpolation coefficient set in an implicit manner by the image encoding apparatus 100 or the image decoding apparatus 600. Referring to FIG. 8, a 4×4 block including a pixel P corresponds to a current block to be decoded through intra prediction. Multiple reference pixel lines, which are located around the current block and are composed of reconstructed pixels, are used for determination of an interpolation scheme or an interpolation coefficient. As illustrated in FIG. 8, each reference pixel line includes a predetermined number of pixels arranged in a line extending in a horizontal direction and a predetermined number of pixels arranged in a line extending in a vertical direction. Alternatively, the reference pixel line may be composed of a predetermined number of pixels arranged in a line extending in the horizontal direction or a predetermined number of pixels arranged in a line extending in the vertical direction.

Referring to FIG. 8, the pixels within Reference pixel line 0 are predicted using the pixels within Reference pixel line 1. In this case, Mode N, which is one of the directional modes and is the same as the intra prediction mode of the current block, is used for prediction. For example, since a reference pixel X which is a prediction pixel of a pixel R included in Reference pixel line 0 is not an integer-position pixel, the reference pixel X is derived by interpolating two integer-position reference pixels as shown in FIGS. 7A and 7B. In this case, a specific interpolation scheme and a specific interpolation coefficient are used.

In this way, the predicted values of the pixels within Reference pixel line 0 are generated, the difference values between the predicted values and the corresponding original pixel values are calculated, and the difference values are summed. The image encoding apparatus 100 or the image decoding apparatus 600 repeats the above described processes using available interpolation schemes and interpolation coefficients and selects an interpolation scheme and or an interpolation coefficient with which the sum of the residuals is least.

The above-described interpolation is performed by the reference pixel interpolators that are respectively included in the intra prediction unit 102 of the image encoding apparatus 100 and the intra prediction unit 607 of the image decoding apparatus 600.

Figure 9:
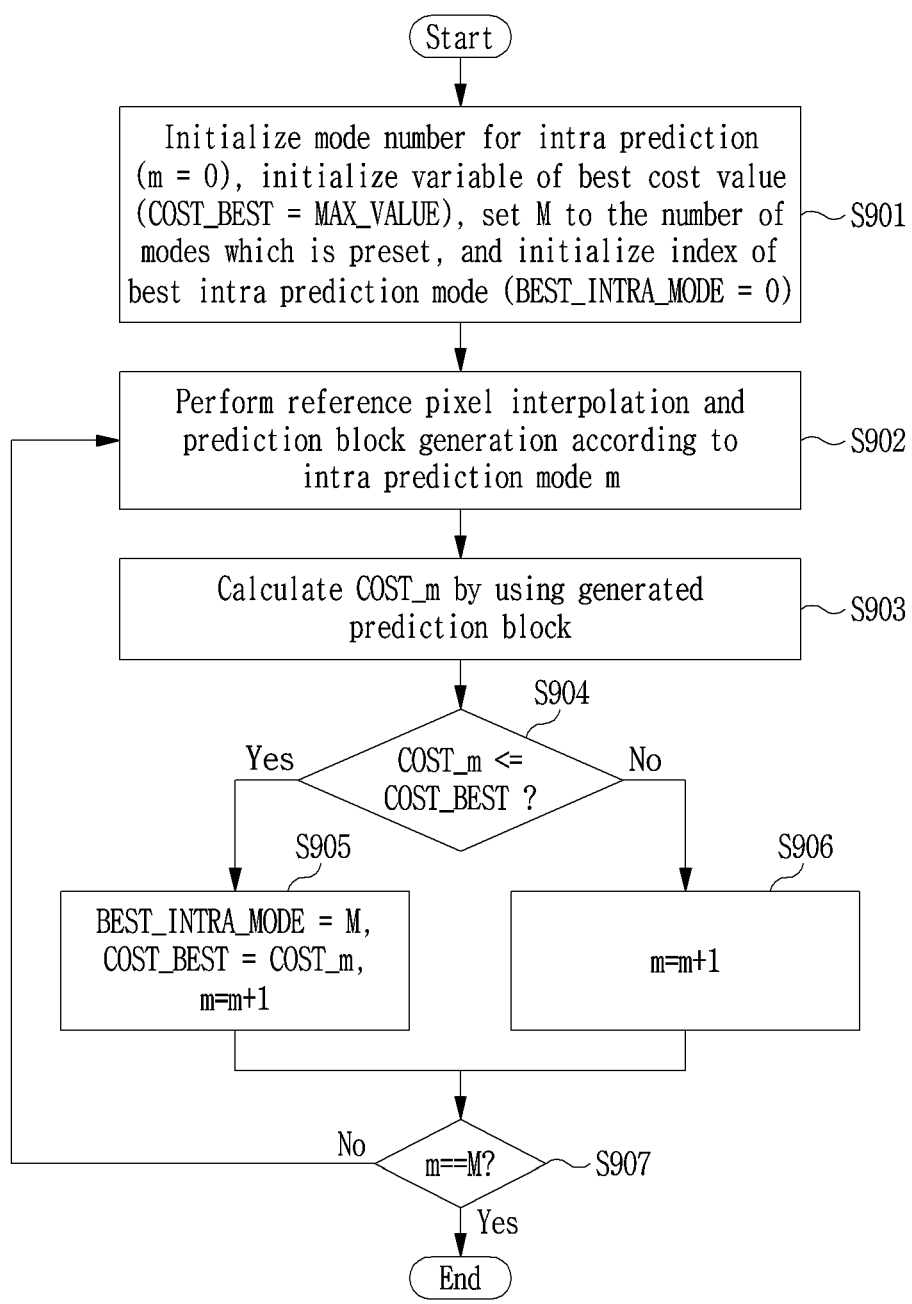
FIG. 9 is a flowchart illustrating a process in which an image encoding apparatus selects a mode for intra prediction.

FIG. 9 is a flowchart illustrating a process in which the image encoding apparatus 100 selects the optimum intra prediction mode. In this case, it is assumed that the interpolation scheme is set by using a block header or an upper layer header.

Referring to FIG. 9, a variable m indicating the mode number of an intra prediction mode is initialized to 0 (i.e., m=0), a variable COST_BEST for storing an optimal cost value is initialized to the maximum cost value MAX_VALUE (i.e., COST_BEST=MAX_VALUE) (S901). Where MAX_VALUE is the maximum value that can be stored in the variable COST_BEST and is a very large value that cannot actually be calculated in the cost calculation. The total number of predetermined intra prediction modes is set in the variable M (S901). BEST_INTRA_MODE indicating the optimal intra prediction mode for the current block is initialized to 0 (i.e., BEST_INTRA_MODE=0) (S901.

Next, the interpolation position corresponding to each pixel position within a block is searched for according to the intra prediction mode m, an interpolation value is generated using a predetermined interpolation scheme or one of multiple interpolation schemes set in the upper layer header, and a prediction block is generated (S902). Next, COST_m, which is a cost value corresponding to m, is calculated using the generated prediction block (S903). Here, COST_m is calculated by using the number of bits required to encode the intra prediction mode, and the difference between the prediction block and the current block. When COST_m is less than or equal to COST_BEST (S904), the m is stored in BEST_INTRA_MODE, which is a variable for storing the optimal intra prediction mode, cost_m is stored in the variable COST_BEST, and m is increased by 1 (S905). When COST_m is greater than COST_BEST, only m is increased by 1 (S906). Finally, when m reaches the maximum number of intra prediction modes, the process ends. When m is less than the maximum number of intra prediction modes, the process returns to S902, and S902 and the subsequent steps are repeatedly performed. When as the interpolation scheme, an interpolation scheme that is preset in the image encoding apparatus 100 or the image decoding apparatus 600 is used, S1 and S2 are set using the methods illustrated in FIGS. 7 and 8, and the pixel X is generated by using the preset interpolation scheme. Every prediction pixel (i.e., the predicted value of every pixel) within a prediction block is generated using the same method. Alternatively, when multiple interpolation schemes are used, S902 is performed in a different manner.

Each prediction block is adaptively generated by using a different interpolation scheme. In this case, S902 among the multiple steps shown in FIG. 9 is changed.

Figure 10:
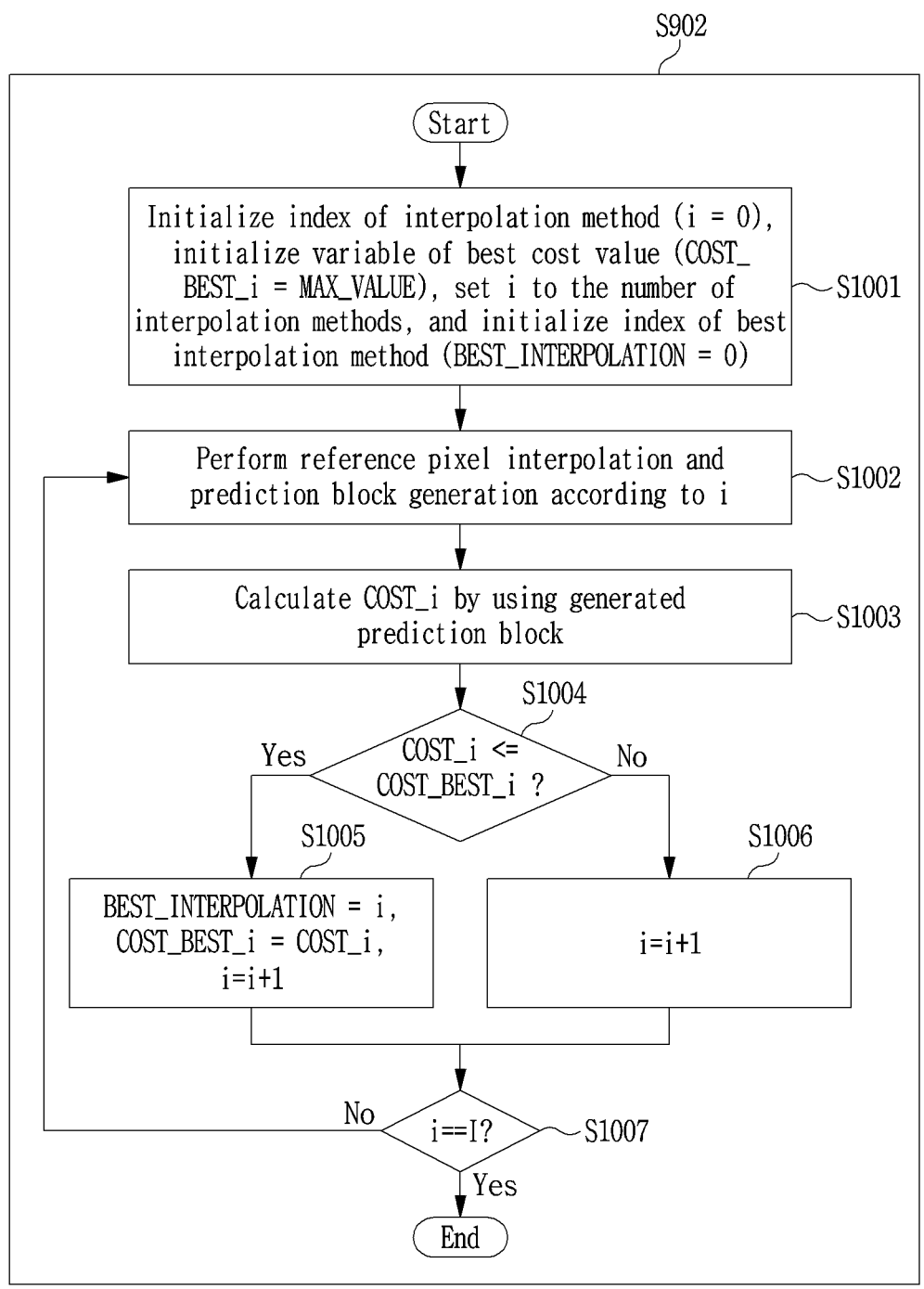
FIG. 10 is a flowchart illustrating a process in which an image encoding apparatus selects an interpolation scheme from among multiple interpolation schemes.

FIG. 10 is a flowchart illustrating a process in which the image encoding apparatus 100 selects an interpolation scheme from among multiple interpolation schemes.

Referring to FIG. 10, the image encoding apparatus 100 initializes a variable i representing an interpolation scheme index to 0 (i.e., i=0), and initializes a variable COST_BEST_i for storing an optimal cost value to the maximum cost value MAX_VALUE (i.e., COST_BEST_i=MAX_VALUE). Where MAX_VALUE is the maximum value that can be stored in the variable COST_BEST and is a very large value that cannot actually be produced through the cost calculation. The variable i is set to the total number of available interpolation schemes. BEST_INTERPOLATION, which is a variable for storing the optimal interpolation scheme used for the current block, is initialized to 0 (S1001). Next, interpolation values corresponding to respective pixel positions of a prediction block are generated according to the interpolation scheme index i, and a prediction block is generated (S1002). Next, COST_i, which is a cost value corresponding to i, is calculated using the generated prediction block (S1003). Here, COST_i is calculated by using the number of bits required to encode the interpolation scheme index and the difference between the prediction block and the current block. When COST_i is less than or equal to COST_BEST_i (S1004), i is stored in BEST_INTERPOLATION, which is a variable for storing the optimal interpolation scheme, cost_i is stored in the variable COST_BEST_i, and i is increased by 1 (S1005). When COST_i is greater than COST_BEST_i, only i is increased by 1 (S1006). Finally, when i reaches the maximum number of available interpolation schemes, the process ends. When not, the process returns to S1002, and S1002 and the subsequent steps are repeatedly performed. When this scheme is used, the number of bits required to encode the interpolation scheme index is added to the number of bits required to encode the intra prediction mode in Step S903 illustrated in FIG. 9 to calculate the cost COST_m.

Figure 11:
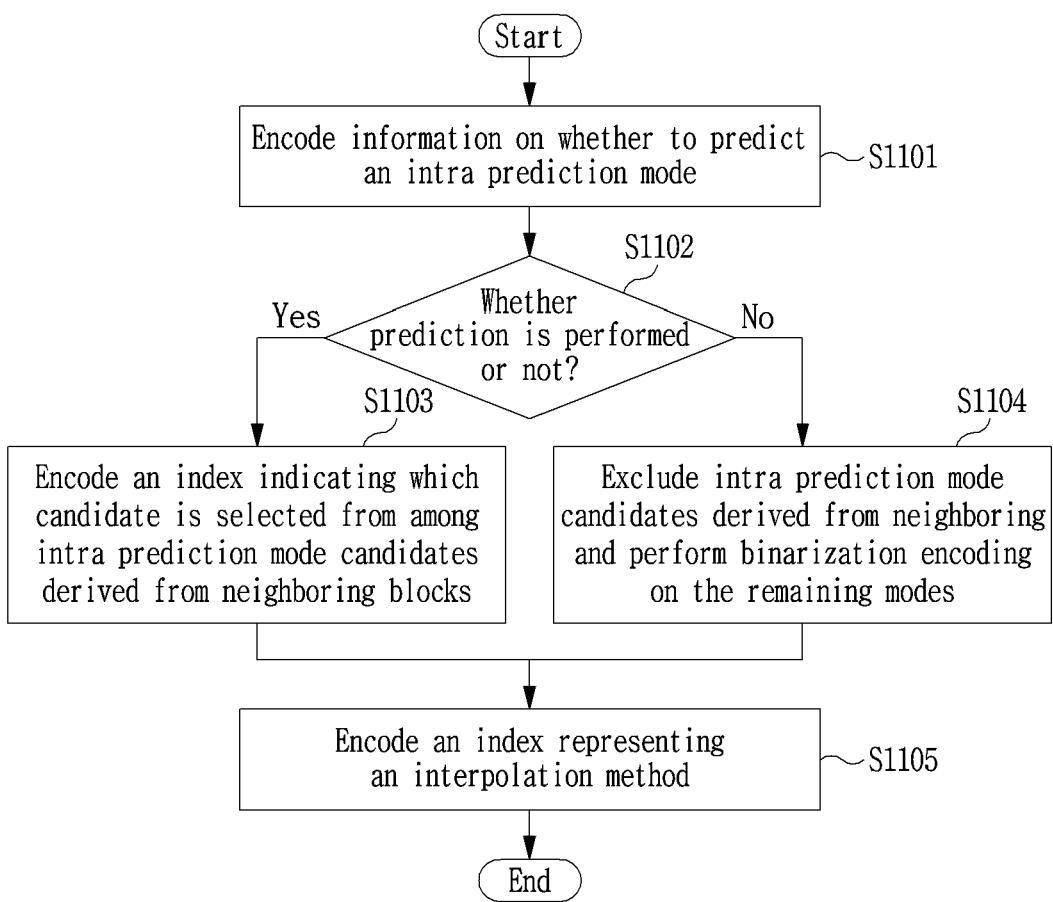
FIG. 11 is a flowchart illustrating a process in which an image encoding apparatus encodes information of an index indicating an interpolation scheme.

FIG. 11 is a flowchart illustrating a process of encoding interpolation scheme index information when one of multiple interpolation schemes is adaptively selected for each prediction block by the image encoding apparatus 100. First, information of whether an intra prediction mode is predicted is encoded for each prediction block (S1101). Next, whether prediction has been performed is determined (S1102). When it is determined that prediction has been performed, an index indicating which candidate among intra prediction mode candidates derived from neighboring blocks is selected is encoded (S1103). Otherwise, the remaining modes except for the intra prediction mode candidates derived from the neighboring blocks are re-arranged, and the currently selected intra prediction mode is binarized and encoded (S1104). Next, the interpolation scheme index indicating the used interpolation scheme is encoded (S1105) and the process ends.

Figure 12:
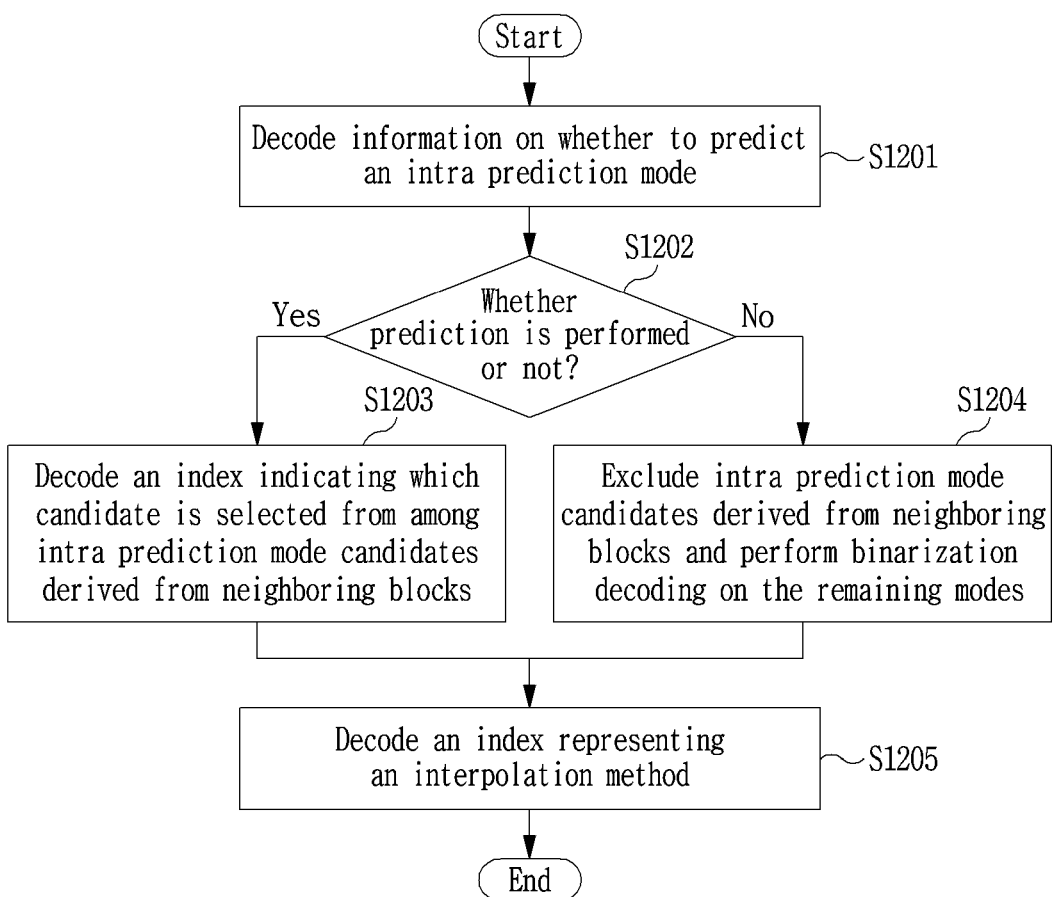
FIG. 12 is a flowchart illustrating a process in which an image decoding apparatus decodes information of an index indicating an interpolation scheme.

FIG. 12 is a flowchart illustrating a process in which the image decoding apparatus 600 decodes the interpolation scheme index information. First, information of whether intra prediction mode is predicted is decoded for each prediction block (S1201). Next, it is checked whether prediction has been performed (S1202). When it is determined that prediction has been performed, an index indicating which candidate among intra prediction mode candidates derived from neighboring blocks is selected is decoded (S1203). Otherwise, the remaining modes except for the intra prediction mode candidates derived from the neighboring blocks are re-arranged, and the currently selected intra prediction mode is decoded (S2104). Next, the interpolation scheme index indicating the interpolation scheme used the encoder is decoded (S1205) and the process ends.

<Derivation of Intra Prediction Pixel Using Multiple Reference Pixel Lines>

Hereinafter, a method of deriving an intra prediction pixel using multiple reference pixel lines, according to another embodiment of the present invention, will be described.

Figure 13:
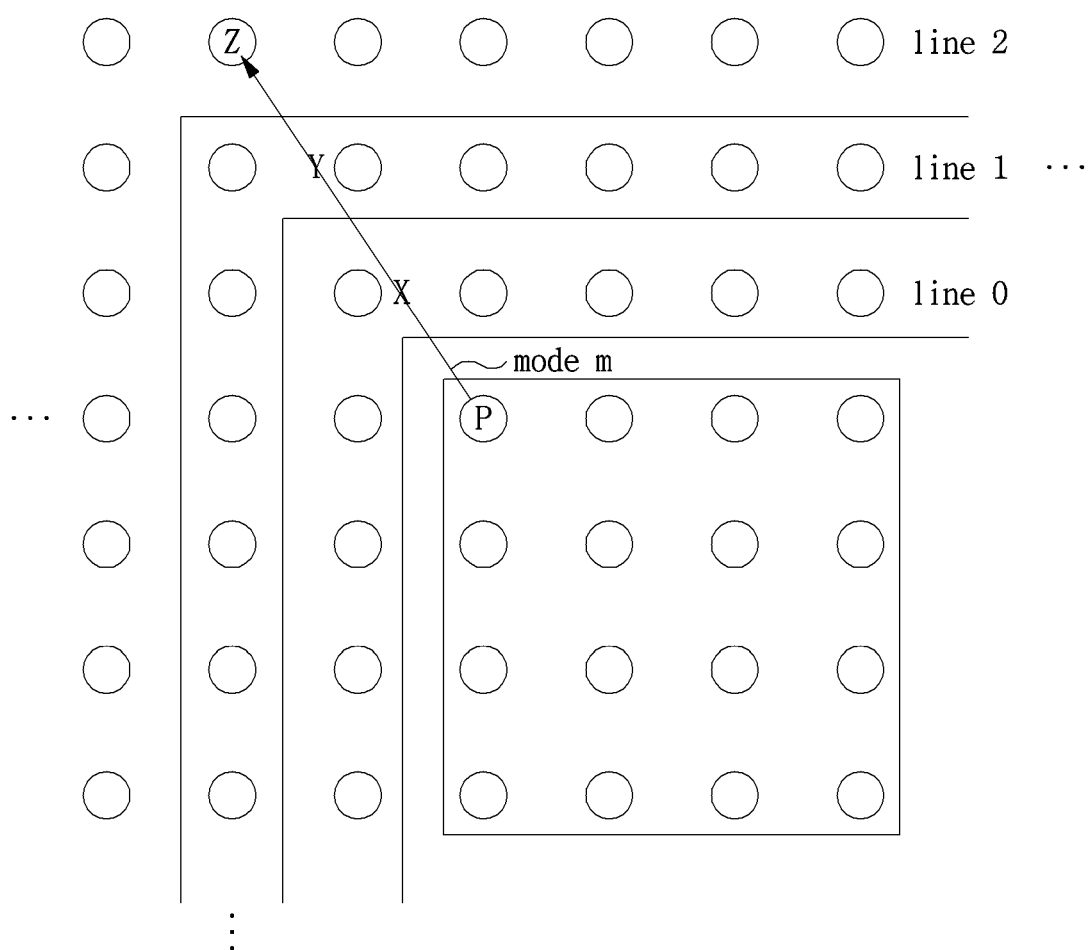
FIG. 13 is a diagram illustrating a process of deriving an intra prediction pixel by using multiple reference pixel lines, according to an embodiment of the present invention.

FIG. 13 is a diagram illustrating a process of deriving an intra prediction pixel by using multiple reference pixel lines, according to an embodiment of the present invention;

Conventionally, one reference pixel line is used for intra prediction. For example, a reference pixel line 0 illustrated in FIG. 13 is a single reference pixel line used for conventional intra prediction. The reference pixel line 0 includes a predetermined number of reference pixels adjacent to the upper boundary of the current block and a predetermined number of reference pixels adjacent to the left boundary of the current block. The present invention can improve the accuracy of intra prediction by deriving a prediction pixel or a prediction block by using various reference pixel lines and reference pixels belonging to the reference pixel lines. The present embodiment can be similarly performed by the intra prediction unit 102 of the image encoding apparatus 100 and the intra prediction unit 607 of the image decoding apparatus 600.

In the following description, it is assumed that a total of three reference pixel lines are used. However, an arbitrary number of reference pixel lines can be used instead of three. Here, the number N of reference pixel lines is included in a block header or an upper layer header so as to be notified to the image decoding apparatus 600. Alternatively, it is also possible that the image encoding apparatus 100 and the image decoding apparatus 600 use predetermined N reference pixel lines without encoding the number N of reference pixel lines.

Referring to FIG. 13, a 4×4 block including a pixel P corresponds to a current block to be encoded or decoded through intra prediction. Three reference pixel lines 0, 1 and 2 are located around the current block.

When the intra prediction mode of the current block is a directional mode with a mode number m, pixels X, Y, and Z within the three reference lines 0, 1, and 2, respectively, can be used as prediction pixels of the pixel P. In this case, it is possible to generate a prediction block using each of the three reference pixel lines and determine an optimum reference pixel line. Reference pixel line index information indicating the determined optimum reference pixel line is encoded by the image encoding apparatus 100. For example, as shown in FIG. 13, a lower index number is assigned as a reference pixel line index for a reference pixel line closer to the current block.

Figure 14:
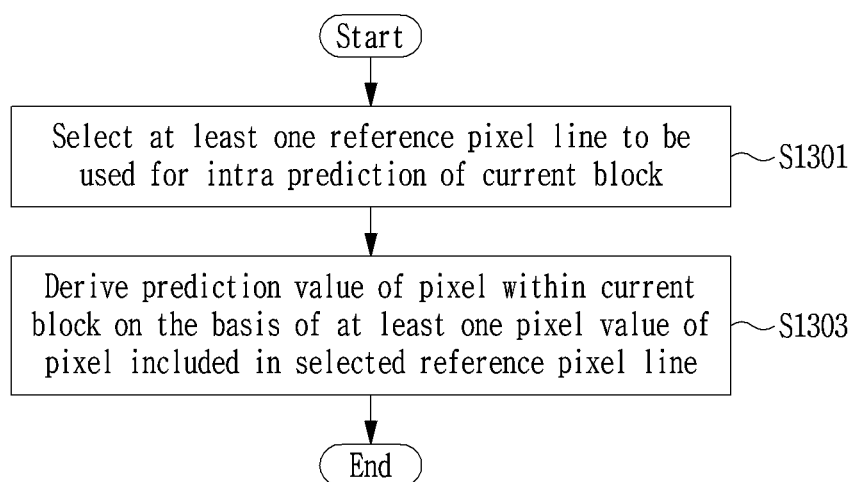
FIG. 14 is a flowchart illustrating a process of deriving an intra prediction pixel value, according to an embodiment of the present invention.

FIG. 14 is a flowchart illustrating a process of deriving an intra prediction pixel value, according to an embodiment of the present invention. Referring to FIG. 14, at least one reference pixel line to be used for intra prediction of a current block is selected from among multiple reference pixel lines (S1301). The multiple reference pixel lines are present in the same image as the current block to be decoded using intra prediction. At least one reference pixel line that is selected for intra prediction of the current block is indicated by a reference pixel line index described above. Alternatively, at least one reference pixel line to be used for intra prediction of the current block may be selected by the image encoding apparatus 100 and the image decoding apparatus 600 in an implicit manner to be described later.

At least one reference pixel line may be selected per prediction block. This case will be described later with reference to FIG. 15. Alternatively, it may be adaptively selected for each pixel within the prediction block. This case will be described later with reference to FIGS. 18 and 19.

The image encoding apparatus 100 or the image decoding apparatus 600 obtains a predicted value of one pixel within the current block on the basis of at least one pixel value included in the one or more selected reference pixel lines (S1303). The image encoding apparatus 100 or the image decoding apparatus 600 may Step S1301, Step S1303, or both to derive a prediction block of the current block.

Figure 15:
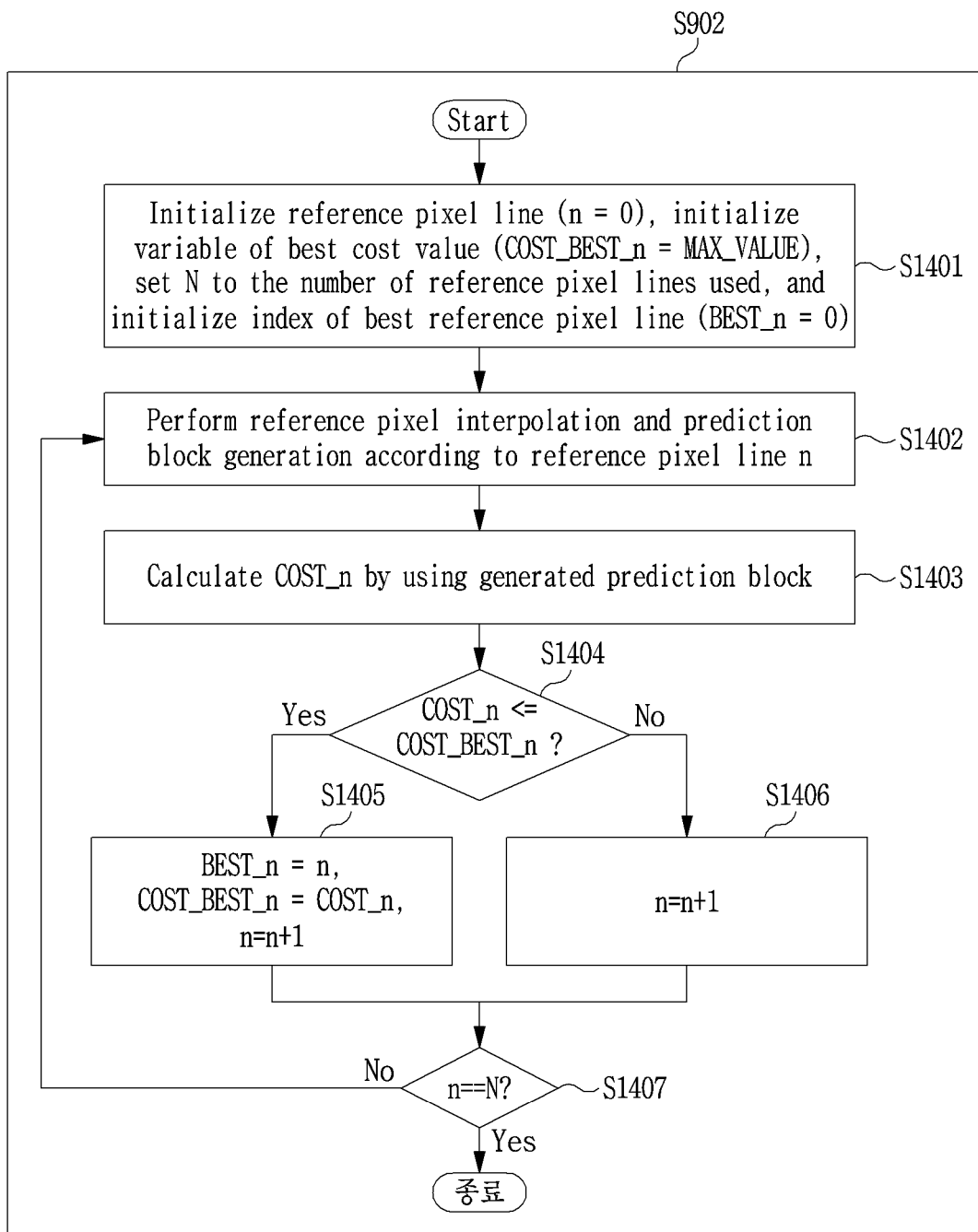
FIG. 15 is a flowchart illustrating a process of adaptively determining a reference pixel line to be used for intra prediction for each prediction block.

FIG. 15 is a flowchart illustrating a process of adaptively determining a reference pixel line to be used for intra prediction for each prediction block. In this case, Step S902 shown in FIG. 9 is replaced with the steps shown in FIG. 15.

Referring to FIG. 15, a variable n for a reference pixel line index is initialized to 0 (i.e., n=0), and a variable COST_BEST_n for storing an optimal cost value is initialized to MAX_VALUE (i.e., COST_BEST_n=MAX_VALUE). Here, MAX_VALUE is the maximum value that can be stored in the variable COST_BEST and is a very large value that cannot actually be produced through the cost calculation. A variable N is set to the total number of preset reference pixel lines. BEST_n which is a reference pixel line index representing the optimal reference pixel line for the current block is initialized to 0 (S1401). Next, an interpolation position corresponding to each pixel position within a prediction block is identified according to the reference pixel line index n, and a prediction block is generated (S1402). Next, COST_n, which is a cost value corresponding to n, is calculated using the generated prediction block (S1403). Here, COST_n is calculated by using the number of bits required to encode the reference pixel line index and the difference between the prediction block and the current block. When COST_n is less than or equal to COST_BEST_n (S1404), n is stored in BEST_n, which is a variable for storing the optimum reference pixel line, Cost_n is stored in the variable COST_BEST_n, and n is increased by 1 (S1405). When COST_n is greater than COST_BEST_n, n is increased by 1 (S1406). Finally, when i reaches the maximum number of reference pixel lines, the process ends. Otherwise, the process returns to S1402. Thus, S1002 and the subsequent steps are performed.

Figure 16:
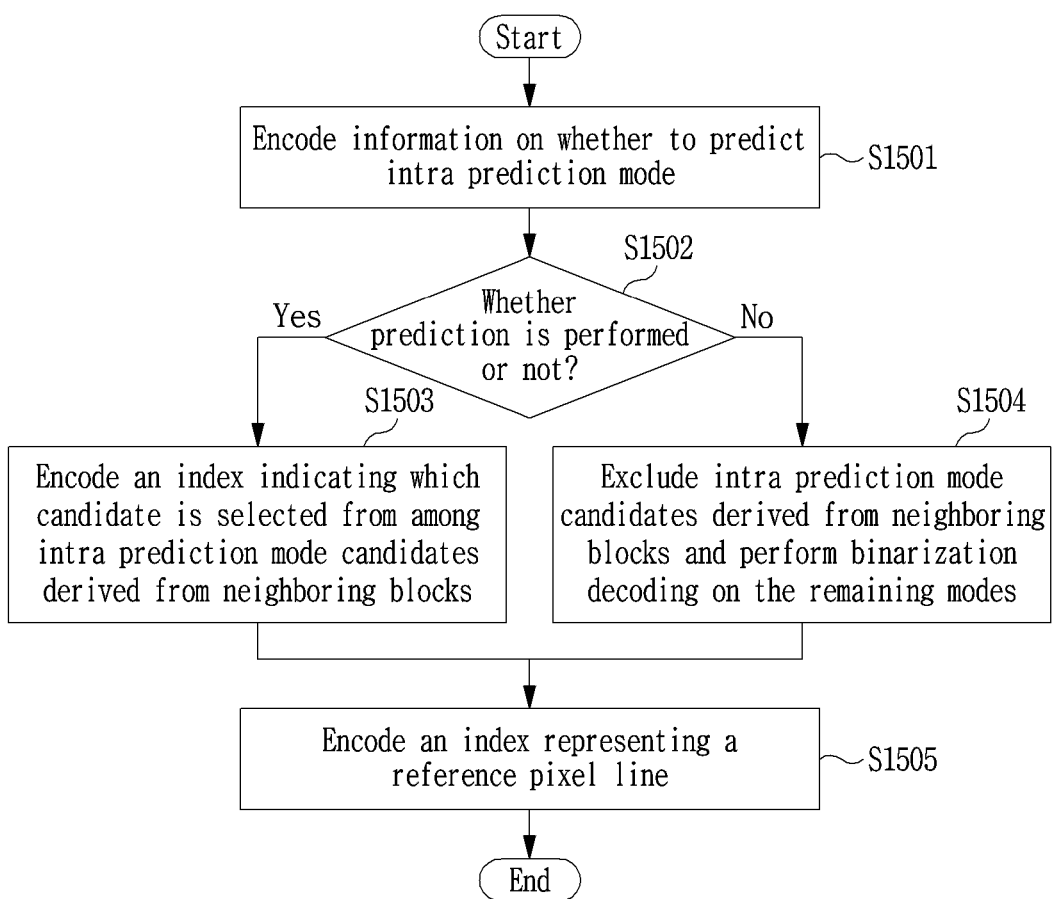
FIG. 16 is a flowchart illustrating a process in which reference pixel line index information is encoded by an image encoding apparatus.

FIG. 16 is a flowchart illustrating a process in which reference pixel line index information indicating a selected reference pixel line is encoded by the image encoding apparatus 100 when a reference pixel line is adaptively selected for each prediction block. First, information of whether prediction for an intra prediction mode is performed for each prediction block is encoded (S1501). Next, it is checked whether the prediction has been performed (S1502). When it is determined that the prediction has been performed, an index indicating which candidate among intra prediction mode candidates derived from neighboring blocks is selected is encoded (S1503). Otherwise, the remaining modes except for the intra prediction mode candidates derived from the neighboring blocks are re-arranged, and the currently selected intra prediction mode is binarized and encoded (S1504). Next, the reference pixel line index indicating the used reference pixel line is encoded (S1505) and the process ends.

Figure 17:
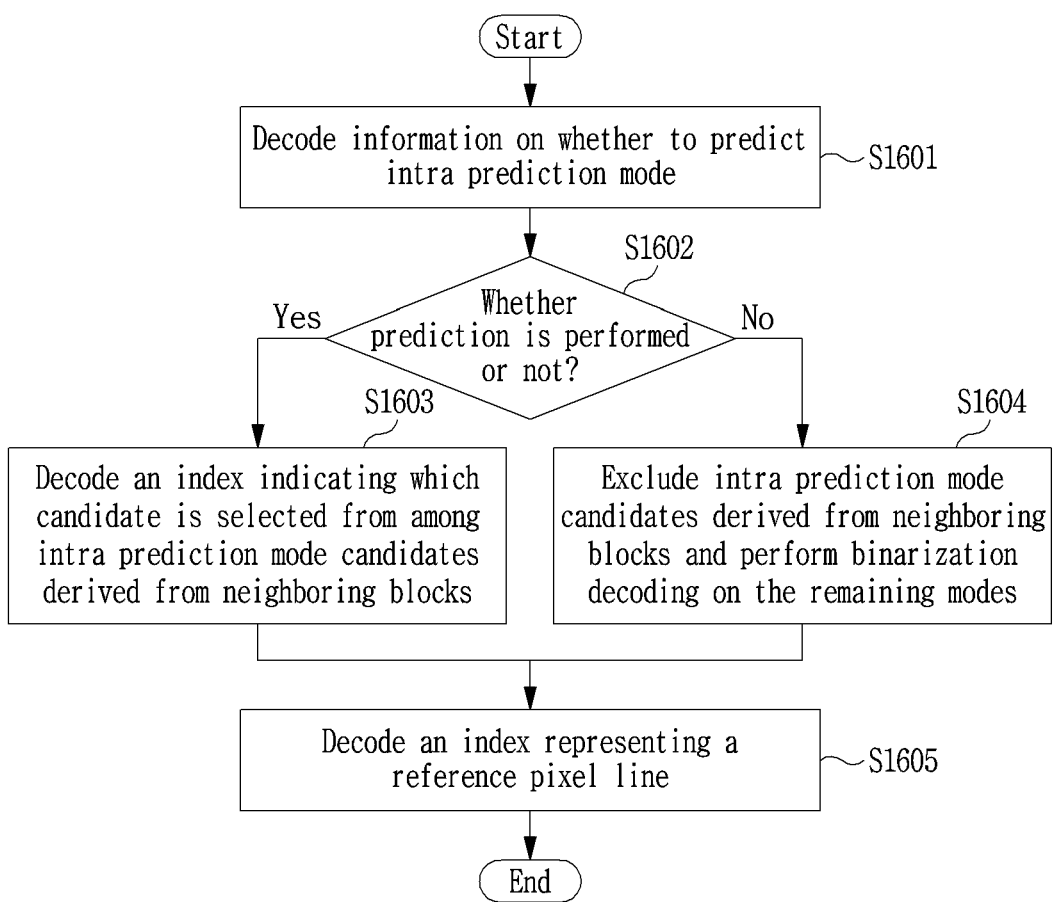
FIG. 17 is a flowchart illustrating a process in which the reference pixel line index information is decoded by an image decoding apparatus.

FIG. 17 is a flowchart illustrating a process in which reference pixel line index information indicating a selected reference pixel line is decoded by the image decoding apparatus 600 when the reference pixel line is adaptively selected for each prediction block. First, information of whether prediction for an intra prediction mode is performed is decoded for each prediction block (S1601). Next, it is checked whether the prediction has been performed (S1602). When it is determined that the prediction has been performed, an index indicating which candidate among intra prediction mode candidates derived from neighboring blocks is selected is decoded (S1603). Otherwise, the remaining modes except for the intra prediction mode candidates derived from the neighboring blocks are re-arranged, and the currently selected intra prediction mode is decoded (S1604). Next, the used reference pixel line index is decoded (S1605) and the process ends.

Figure 18:
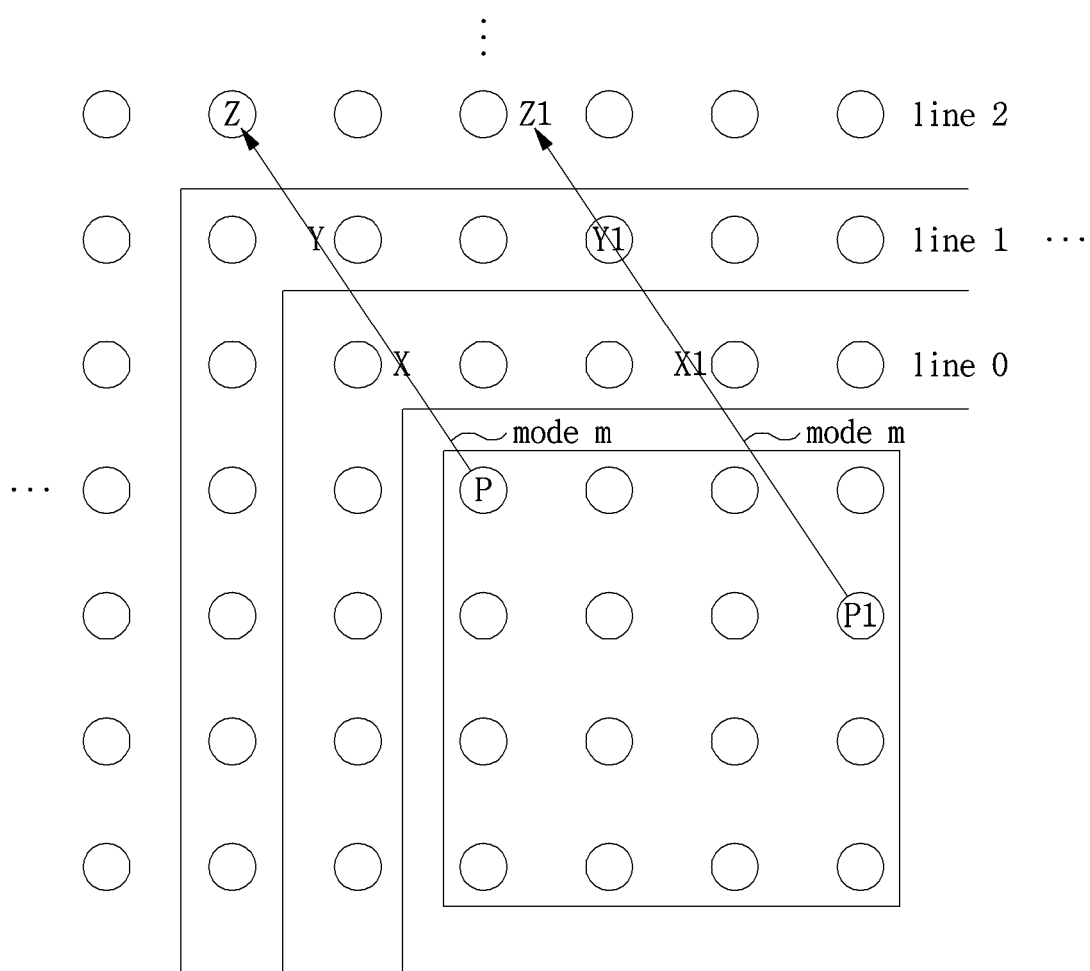

Next, with reference to FIGS. 18 and 19, a method of adaptively determining a reference pixel line for each pixel position within a prediction block without transmitting a reference pixel line index will be described.

For each pixel within a prediction block, the precision of the positions of prediction pixels obtained by interpolating reference pixels within a reference pixel line may differ. Therefore, among the prediction pixels obtained through interpolation within each reference pixel line, a prediction pixel closest to an integer pixel position is selected as a prediction pixel of a current pixel P. In this case, the above process can be performed on N reference pixel lines that are predetermined.

When there are multiple prediction pixels at integer pixel positions, a prediction pixel close to the current block is selected as the final prediction pixel.

FIG. 19 is a reference diagram illustrating a method of adaptively selecting a reference pixel line without transmitting a reference pixel line index. As shown in FIG. 19, a prediction pixel line is adaptively selected for each prediction block, with priority given to a line having a larger number of pixels located at inter positions. Assuming that the precision and the frequency of the interpolated pixels used to generate the prediction block by using each of the reference pixel lines are the same as illustrated in FIG. 19, a line may be selected while weighting according to the precision of each pixel position.

Referring to FIG. 19, when generating a prediction block using a line 1, five prediction pixels at integer pixel positions, three prediction pixels at ½-pixel positions, four prediction pixels at ¼-pixel positions, two prediction pixels at ⅛-pixel positions, one prediction pixel at a ¹⁄₁₆-pixel position, and one prediction pixel at a 1/32-pixel position are selected. Accordingly, there are a total of 16 prediction pixels within the prediction block. This similarly applies to a reference pixel line 2 and a reference pixel line 3.

When priority is given only to integer pixel positions, the line 1 having the largest number of integer positions is selected as the reference pixel line. Alternatively, weights may be given to respective positions, the weighted sums may be calculated for each line, and the line having the largest calculated value may be selected as the reference pixel line. Alternatively, weights may be given to respective lines, the weighted sums may be calculated for each line, and the line having the largest calculated value may be selected as the reference pixel line. Alternatively, weights may be given to respective positions and respective lines, the weighted sums may be calculated for each line, and the line having the largest calculation value may be selected as the reference pixel line.

As another embodiment, weights are given to respective lines, and a prediction block is generated by using the weighted sum as a pixel value. For example, when pixel values of the X, Y, and Z positions in FIG. 13 exist, a larger weight is given to a pixel closer to the current block, and the weighted sum is selected as a prediction pixel for a position P. Alternatively, a larger weight may be given to a pixel closer to an inter pixel position, and the weighted sum may be selected as a prediction pixel at for the position P. Alternatively, in addition to the method of deriving a prediction pixel using the weighted sum, that is, the weighted average, the predicted value of a pixel can be derived by using an arithmetic average, a median value, or the like.

Alternatively, from among N reference pixel lines, one reference pixel line that is indicated by an encoded reference pixel line index is excluded, and N−1 reference pixel lines may be used. For example, when the reference pixel line index is set to 1, N−1 lines excluding the line 1 are used. In this case, when a predicted value is interpolated by using a mode with a mode number m, a higher priority is given to a position closer to an integer pixel position, or the priorities are given differently according to the precision of the interpolated positions. Alternatively, it is possible to generate a predicted value on a per pixel basis, by using reference pixels selected from arbitrary reference pixel lines except for the line 1, in accordance with a predetermined priority order.

Alternatively, a case is also possible in which the image encoding apparatus 100 encodes information indicating whether a method of directly encoding a reference pixel line index into a block header or an upper layer header is used or a method of not encoding a reference pixel line index is used, and transmits the encoded information to the image decoding apparatus 600.

<Smoothing Between Prediction Block and Reference Pixel Line>

Hereinafter, smoothing between the prediction block and the reference pixel line will be described as another embodiment of the present invention.

When a prediction block is derived by using a predetermined pixel or predetermined multiple pixels within a reference pixel line, there may be a discontinuity between reference pixel line(s) that is (or are) that used for the derivation of the prediction block and the prediction block, or between the prediction block and a region adjacent to the prediction block. In order to reduce the discontinuity, smoothing is performed. A smoothing filter is a kind of low-pass filter.

The smoothing according to an embodiment of the present invention is performed by both of the intra prediction unit 102 of the image encoding apparatus 100 and the intra prediction unit 607 of the image decoding apparatus 600.

Figure 20:
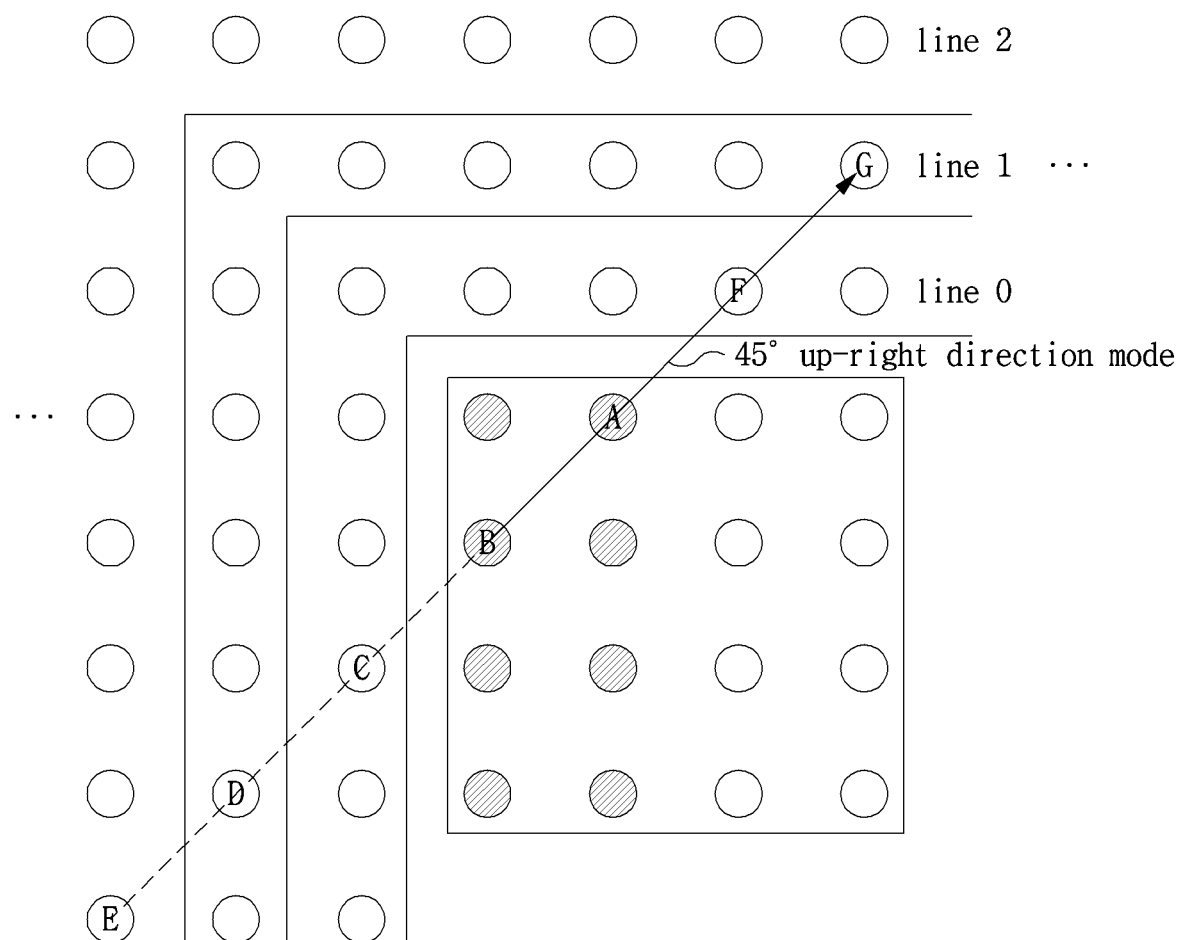
FIG. 20 is a diagram illustrating smoothing between a prediction block and a reference pixel line.

FIG. 20 is a diagram illustrating a method of smoothing the boundary between a prediction block and a reference pixel line.

Hereinafter, a case where a mode corresponding to a 45° up-right direction is used for intra prediction will be described. In addition, it is assumed that a reference pixel line 1 is selected for intra prediction. In addition, in the following description, the smoothing is applied to pixels A to E. However, this smoothing may similarly apply to other pixels.

In the example of FIG. 20, since the intra prediction is performed in the 45° up-right direction, the smoothing is performed in a 45° down-left direction which is opposite to the direction in which the intra prediction direction is performed. In this case, a region of a prediction block to which the smoothing is applied is determined according to the size or type of the prediction block of the current block. In FIG. 20, the pixels belonging to the half of the prediction block undergo the smoothing. That is, the smoothing is applied only to the shaded pixels located within the left half region. Alternatively, a predetermined region or a region corresponding to a predetermined ratio may undergo the smoothing, depending the size of the prediction block or the intra prediction mode. For example, only one quarter of the prediction block may undergo smoothing. Of the prediction block, a partial region corresponding to a different ratio may undergo the smoothing.

In FIG. 20, since the reference pixel line 1 is determined as the reference pixel line for intra prediction, a prediction pixel A may be smoothed using Equation 1 and a pixel D within the reference pixel line 1.

$$A'=(w1 \times A + w2 \times D)/(w1+w2) \qquad \text{[Equation 1]}$$

In Equation 1, A', A, and D are respectively the value of the prediction pixel A which results from the smoothing, the initial value of the prediction pixel A before the smoothing, and the value of the reference pixel D. Further, w1 and w2 are weights applied to the prediction pixel A and the reference pixel D, respectively.

Further, the prediction pixel B is smoothed by using an equation similar to Equation 1 and the reference pixel D within the reference pixel line 1.

The strength of the smoothing is determined depending on the distance. Since the distance between the prediction pixel A and the pixel D is longer than the distance between the prediction pixel B and the pixel D, smoothing is more strongly performed for the prediction pixel A and the reference pixel D than for the prediction pixel B and the reference pixel D. The stronger smoothing is performed by placing a larger weight on the reference pixel D.

The reference pixel line used for smoothing may differ from the reference pixel line used for intra prediction. A reference pixel line closer to the prediction block may be used for smoothing. Referring to FIG. 20, although the reference pixel line 1 is selected for intra prediction, the pixel used for smoothing of the prediction pixels A and B is not set to D but is set to C. In this case, the strength of the smoothing is selected depending on the distance. For example, when the prediction pixel B is smoothed using the reference pixel C, the same weight is applied to each pixel. When the prediction pixel A is smoothed using the reference pixel C, a larger weight is placed on the pixel C for smoothing.

When performing smoothing, it can be bidirectionally performed. For example, in a case where the reference pixel line 0 is used for smoothing, when the prediction pixel A is smoothed, the prediction pixel A is smoothed while applying different weights to the reference pixels F and C. When smoothing the prediction pixel B, the prediction pixel B can be smoothed while applying different weights to the reference pixels F and C. At this time, since the line 1 is selected as the reference pixel line for intra prediction, the pixel G may be used for the up-right direction and the pixel C may be used for the down-left direction.

According to an embodiment of the present invention, the weights may vary depending on the distances between the reference pixels and the prediction pixels. For example, when the prediction pixel A is smoothed using the reference pixels F and C, since the distance between the pixels C and A is longer than the distance between the pixels F and A, smoothing is performed by placing a larger weight on the reference pixel C. It is also possible to perform smoothing using arbitrary lines and a predetermined method. It is also possible to encode information on whether smoothing is performed per block. Alternatively, it can be encoded using an upper layer header. It is also possible that the encoder and the decoder perform the same operation under predetermined conditions without encoding the information on whether smoothing is applied or not. For example, it may be determined whether or not smoothing is performed depending on which of the intra prediction modes is used. In the present embodiment, the strength of the smoothing is increased as the distance between the prediction pixel and the reference pixel is increased. However, the opposite is also possible depending on the characteristics of the image.

Next, with reference to FIG. 21 and FIGS. 22A to 22D, according to an embodiment of the present invention, a basic unit by which a reference pixel line is selected for intra prediction will be described.

Figure 21:
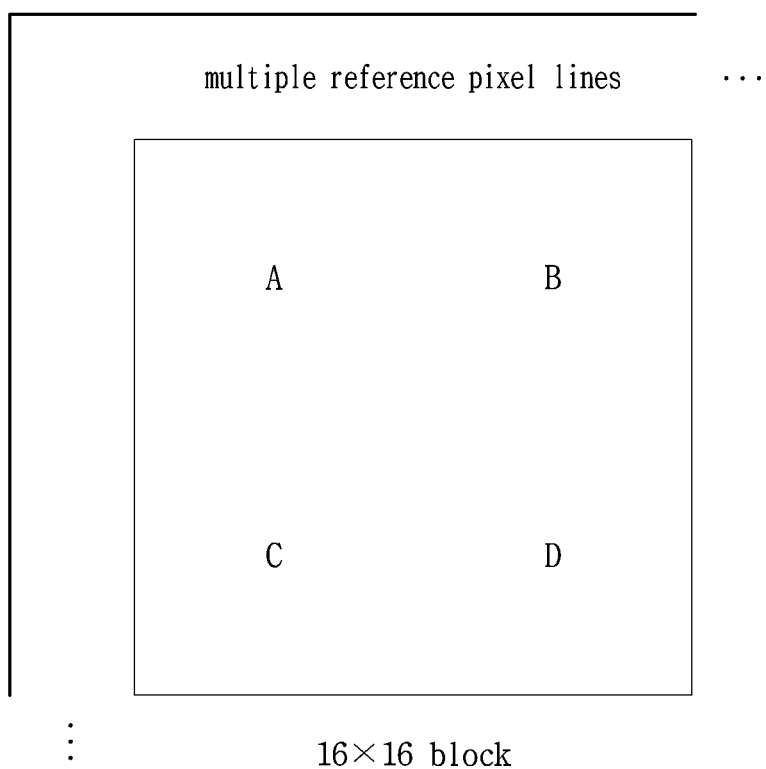
FIG. 21 shows a case where a reference pixel line is used for all transform blocks within a current block.

Hereinafter, for convenience of description, it is assumed that a current block has a 16×16 size. The current block is divided into four 8×8 transform blocks (Tbs). A transform is performed per 8×8 block. Thus, a total of four transforms are performed. To be prepare for transformation, a current block can be divided into multiple transform blocks smaller than the size of the current block. Accordingly, when an intra prediction mode is determined in units of current blocks, the determined intra prediction mode is applied in units of transform blocks, and the actual prediction is performed in units of transform blocks. This scheme has an advantage of compensating for the defect that the correlation between pixels is decreased when the distance between the reference pixel and the current block is increased. Referring to FIG. 21, when intra prediction is performed on a block-by-block basis, the pixels of the transform block A are closer to the reference pixels than the pixels of the transform block D. Since the pixels in the transform block D are far from the reference pixels, the prediction efficiency for the pixels in the transform block D is lowered.

In order to compensate for the above-described drawback, only the intra prediction mode is determined on a block-by-block basis, and the intra prediction is performed on a per transform block basis.

FIG. 21 shows the case where at least one reference pixel line selected for intra prediction of a current block is used for all the transform blocks within the current block when intra prediction is performed on a per transform block basis.

FIGS. 22A to 22D show the case where at least one reference pixel line is selected for each transform block and is used for intra prediction.

Figure 22A:
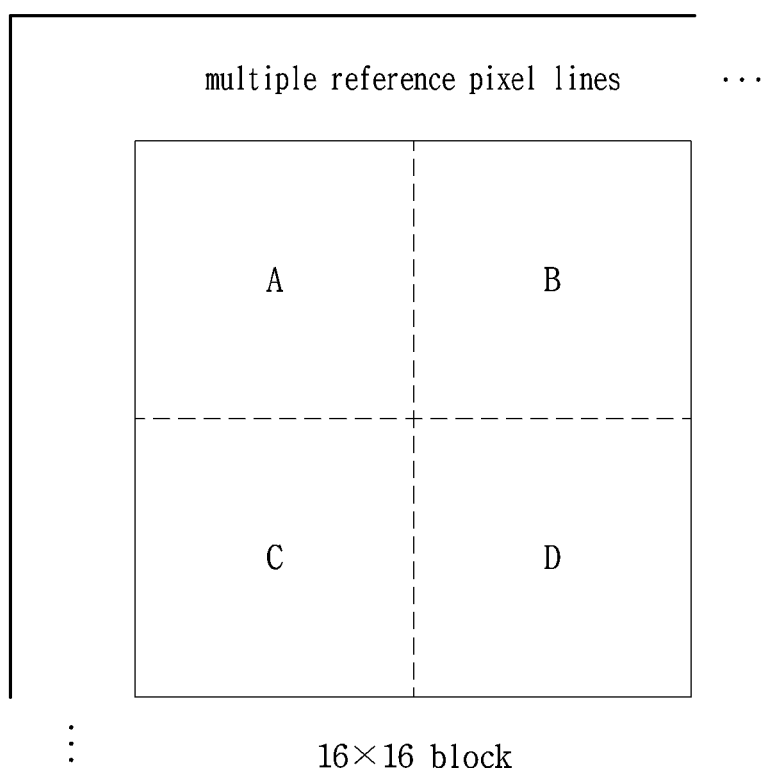
FIGS. 22A to 22D show a case where a reference pixel line is selected per transform block and the selected reference pixel line is used for intra prediction.

Referring to FIG. 22A, when four transform blocks, each having a size of 8×8, are used and prediction is performed on a transform block basis, the same reference pixel lines as shown in FIG. 21 are used for intra prediction of the transform block A.

Figure 22B:
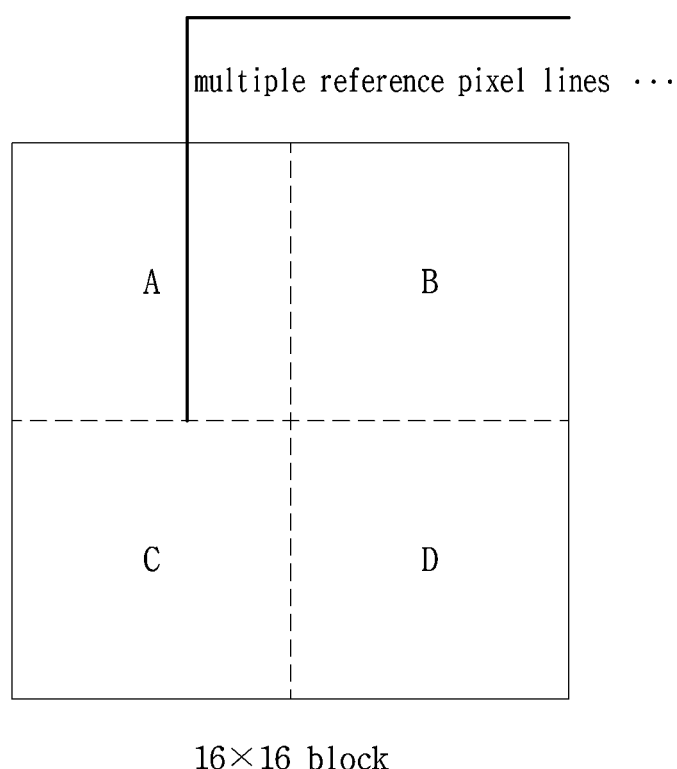
Figure 22C:
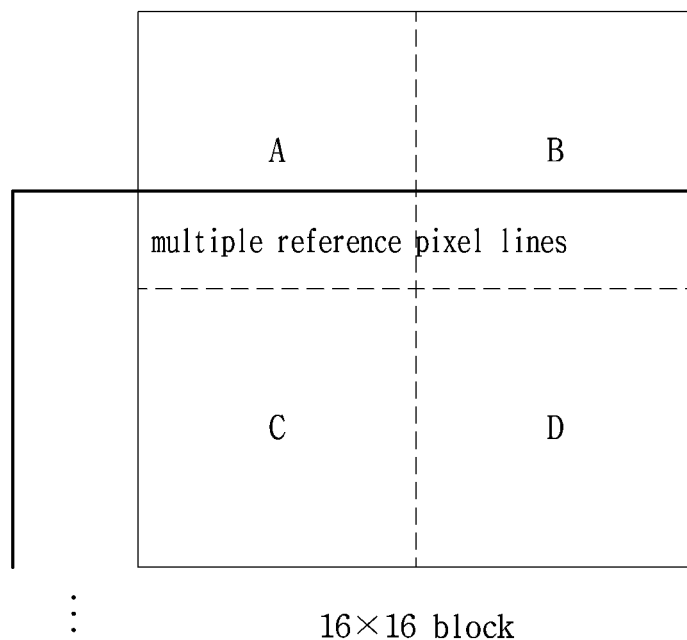
Figure 22D:
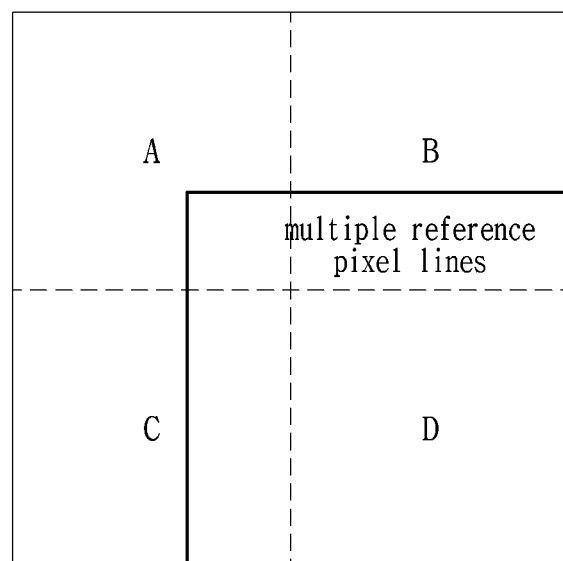

Referring to FIG. 22B, for the transform block B, intra prediction is performed by using the pixels of the reconstructed transform block A and the reference pixel lines as illustrated. Similarly, in FIG. 22C, intra prediction is performed by using the pixels of the reconstructed transform blocks A and B and the reference pixels lines as illustrated. In FIG. 22D, intra prediction is performed by using the pixels of the reconstructed transform blocks A, B, and C and the reference pixel lines as illustrated.

As described above, in the case of using multiple reference pixel lines, the pixel lines determined on a block-by-block basis as illustrated in FIG. 21 can be used as they are in the case of performing prediction on a per transform block basis as illustrated in FIGS. 22A to 22D. Alternatively, it is also possible to obtain an optimum reference pixel line for each transform block. Alternatively, information on whether the optimum reference pixel line selected for each block unit is used for all of the transform blocks or a new optimum reference pixel line is derived for each transform block is encoded into a block header or an upper layer header for notification to the image decoding apparatus 600.

Next, various embodiments and application examples related to the derivation, encoding, and decoding of the intra prediction mode according to the present invention will be described with reference to the drawings. When the intra prediction mode derivation method according to the present invention is used, the image encoding apparatus and the image decoding apparatus can derive an intra prediction mode by using the same method and/or on the same criterion. Therefore, it is not necessary to transmit information required for notification of an intra prediction mode to the image decoding apparatus.

<Derivation of Intra Prediction Mode by Image Decoding Apparatus>

In the present embodiment, a method in which an intra prediction mode is derived by an image decoding apparatus is described. The derivation of an intra prediction mode by the image decoding apparatus, according to the present invention, is referred as decoder-side intra mode derivation (DIMD). However, the DIMD can also be performed by the image encoding apparatus. Accordingly, the DIMD can be performed by the image encoding apparatus 100 as well as the image decoding apparatus 600, despite the name of DIMD. In particular, the DIMD may be performed by the intra prediction unit 102 of the image encoding apparatus 100 and the intra prediction unit 607 of the image decoding apparatus 600 in the same manner.

Hereinafter, various embodiments of the DIMD according to the present invention will be described with reference to the drawings.

First Embodiment

Figure 23:
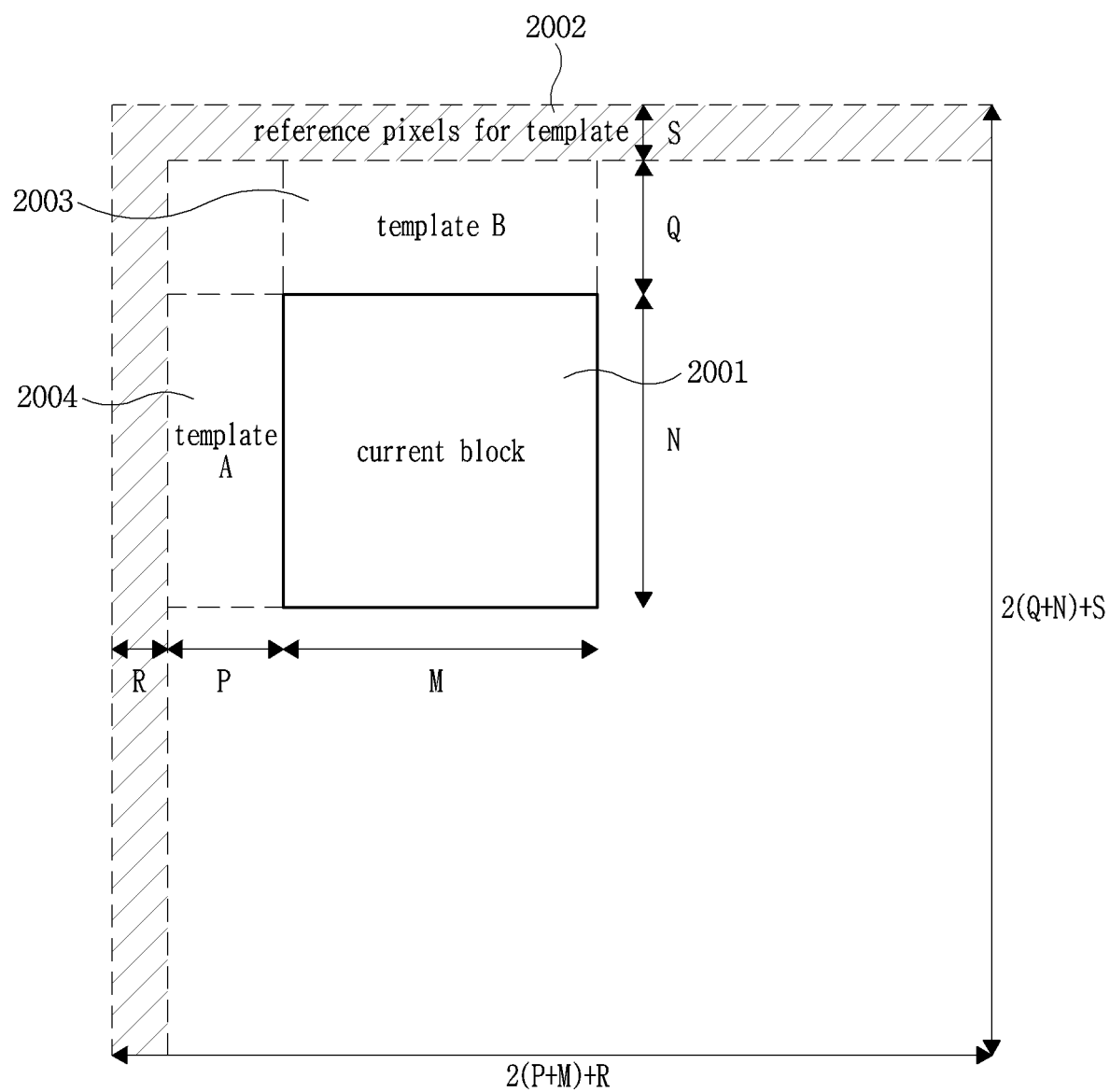
FIG. 23 is a diagram illustrating DIMD according to a first embodiment of the present invention.

FIG. 23 is a diagram illustrating DIMD according to a first embodiment of the present invention. According to an embodiment of the present invention, an intra prediction mode of a current block can be derived using already reconstructed pixels located around the current block.

Referring to FIG. 23, the size of a current block 2001 to be encoded or decoded is assumed to be M×N, the size of a template A 2004 is assumed to be P×N, and the size of a template B 2003 is assumed to be M×Q. As illustrated in FIG. 23, a reference pixel region 2002 is composed of a region located on the left side of the template A 2004 and a region located above the template B 2003.

Assuming that the values of R and S that represent the size of the reference pixel region 2001 are respectively 1 and 1, the reference pixel region 2002 includes as many reference pixels as 2(Q+N)+2(P+M)+1.

According to an embodiment of the present invention, predicted values of pixels within the template A 2004 and the template B 2003 are calculated using the reference pixels within the reference pixel region 2002 according to each of the available intra prediction modes. In this case, the template A 2004 and the template B 2003 are treated as one region. For example, predicted values of the pixels within the template A 2004 and the template B 2003 are calculated using the reference pixels within the reference pixel region 2002 according to each of 35 intra prediction modes illustrated in FIG. 2. For each mode of the 35 intra prediction modes, the sum of absolute difference (SAD) which is the sum of the difference between the original value and the reconstructed value of the template A 2004 and the difference between the original value and the reconstructed value of the template B 2003 is calculated. Then, the intra prediction mode having the least SAD is selected as the intra prediction mode of the current block 2001.

Since the intra prediction mode of the current block 2001 is derived using the pixels reconstructed by the image coding apparatus 100 or the image decoding apparatus 600, both of the image coding apparatus 100 and the image decoding apparatus 600 can derive the same intra prediction mode.

On the other hand, the intra prediction mode used for luminance pixels can be used for chrominance pixels. Since the intra prediction mode is not transmitted to the image decoding apparatus 600 from the image encoding apparatus 100, there is no overhead burden. Thus, it is also possible to add an intra prediction mode at a ½ position, ⅓ position, or ¼ position between adjacent angular modes. Information on the number of intra prediction modes used at this time can be transmitted to the image decoding apparatus 600 in various ways. For example, the information is encoded into the header of a block or an upper layer block, such as a slice header, a picture header, or a sequence header, using the repeated multiplication of 2 (i.e., 2 to the n-th power, 2"). The encoded information is transmitted to the image decoding apparatus 600. Alternatively, information on the number of available intra prediction modes can be transmitted to the image decoding apparatus 600 in a manner of transmitting an index indicating one of multiple intra prediction mode lists composed of different numbers of intra prediction modes.

In the above-described embodiment, two templates including the template A 2004 and the template B 2003 are used to derive the intra prediction mode of the current block 2001. However, three or more templates may be used.

In the above-described embodiment, the final intra prediction mode is derived by applying all of the intra prediction modes to the template A 2004 and/or the template B 2003. However, the final prediction mode of the current block 2001 may be derived not by using all the intra prediction modes but by using only some selected intra prediction modes.

Second Embodiment

In the first embodiment described above, the two templates (template A 2004 and template B 2003) are regarded as one region. However, in a second embodiment, two templates (template A 2004 and template B 2003) are treated as separate regions. Specifically, two prediction modes are derived for a current block by using the two templates, respectively, and one of the two prediction modes is selected as the final prediction mode.

For example, referring to FIG. 2, only the angular modes on the left side of Mode 18 are used to obtain SADs for the template A 2004. Among the values of the SADs calculated for the respective angular modes on the left side of Mode 18, a mode with which the least SDA value is calculated is determined as the intra prediction mode of the template A 2004.

Next, only the angular modes on the right side of Mode 18 are used to obtain SADs for the template B 2003. Among the values of the SADs calculated for the respective modes on the right side of Mode 18, a mode with which the least SDA value is calculated is determined as the intra prediction mode of the template B 2003. Next, one of the intra prediction mode of the template A 2004 and the intra prediction mode of the template B 2003 is finally selected as the prediction mode of the current block 2001.

The SAD value corresponding to the DC mode and the SAD value corresponding to the planar mode are obtained by applying the DC mode and the planar mode to each template. Next, the SAD value corresponding to the mode selected as the intra prediction mode of a corresponding one of the templates among the angular modes, the SAD value corresponding to the DC mode, and the SAD value corresponding to the planar mode are compared with each other. Thus, the final intra prediction mode of each template is selected.

Third Embodiment

Hereinafter, a third embodiment regarding DIMD, according to the present invention, will be described.

The third embodiment according to the present invention relates to a method of executing DIMD using only the available templates when a part of the templates for a current block are not available.

Figure 24:
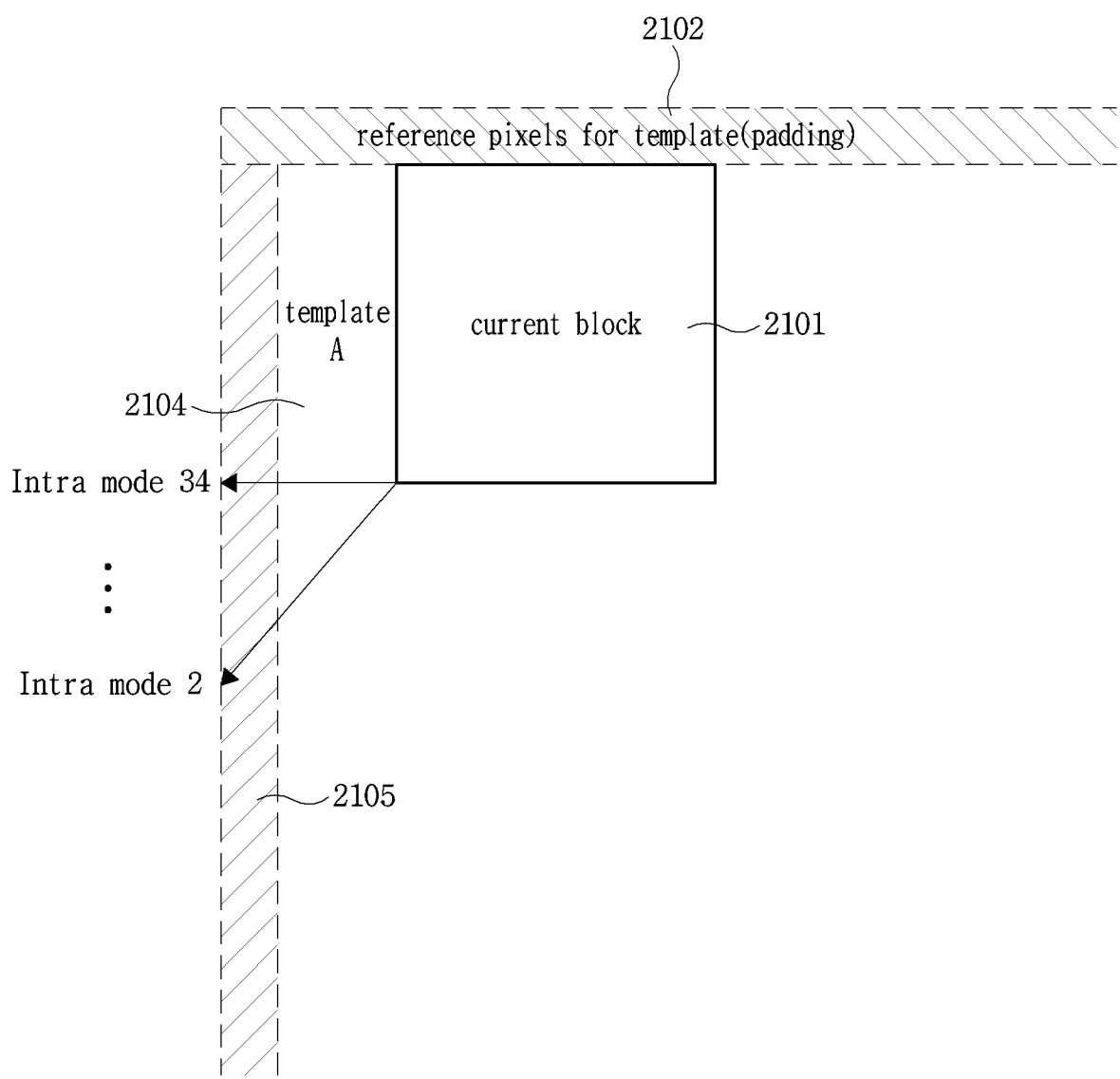
FIG. 24 is a diagram illustrating DIMD according to a third embodiment of the present invention.

FIG. 24 is a diagram illustrating DIMD according to a third embodiment of the present invention.

Referring to FIG. 24, the template on the upper side of the current block 2101 is not usable, and only the template A 2004 on the left side is available.

When the image encoding apparatus 100 and the image decoding apparatus 600 use 35 intra prediction modes as illustrated in FIG. 2 and any one of the two templates is unavailable, the 35 intra prediction modes are applied to only one template 2104 by setting a range as shown in FIG. 24. In FIG. 24, the left lower 45° direction is set as intra prediction mode 2, the horizontal direction is set as intra prediction mode 34, and 33 angular modes exist between mode 2 and mode 34.

Ad described above, DIMD is performed by applying the 33 angular modes, the DC mode, and the planar mode to the template A 2104 to derive an intra prediction mode of the current block 2101.

When the current block 2101 corresponds to the upper boundary of an input image, reference pixels 2105 on the left side of the template A 2104 are available but reference pixels on the upper side of the template A 2104 are not present. In this case, upper reference pixels 2102 can be generated by padding appropriate neighboring pixels. The neighboring pixels used for the padding may be pixels positioned on the upper side of the current block 2101 and/or the template A 2104, or reference pixels 2105 positioned on the left of the template A 2104.

Fourth Embodiment

Figure 25:
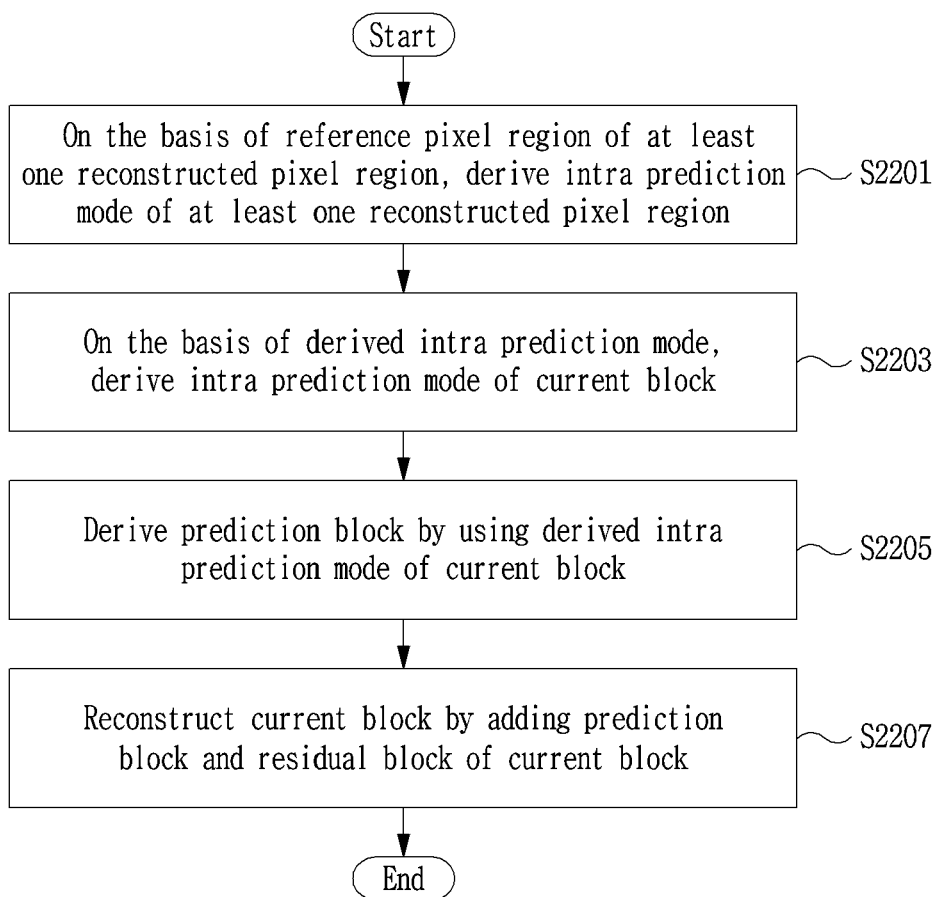
FIG. 25 is a flowchart illustrating DIMD according to the present invention.

FIG. 25 is a flowchart illustrating DIMD according to the present invention. This embodiment is related with the first through third embodiments described above. The method illustrated in FIG. 25 can be performed in the same manner by the intra prediction unit 102 of the image encoding apparatus 100 and the intra prediction unit 607 of the image decoding apparatus 600.

Referring to FIG. 25, an intra prediction mode of a reconstructed pixel region is derived on the basis of a reference pixel region of at least one reconstructed pixel region (S2201). Here, at least one pixel region may be the template 2004 or 2104 and/or the template B 2003 described in the previous embodiments. However, the present invention is not limited to these templates. The reference pixel region may correspond to the reference pixel region 2002, 2102, or 2105 described in the previous embodiments. However, the present invention is not limited to these reference pixel regions.

Next, an intra prediction mode of the current block is derived on the basis of the intra prediction mode of the reconstructed pixel region, which is derived in Step S2201 (S2203). After obtaining the intra prediction block of the current block using the derived intra prediction mode (S2205), the current block is reconstructed by summing the obtained intra prediction block and a residual block of the current block (S2207).

Fifth Embodiment

Figure 26:
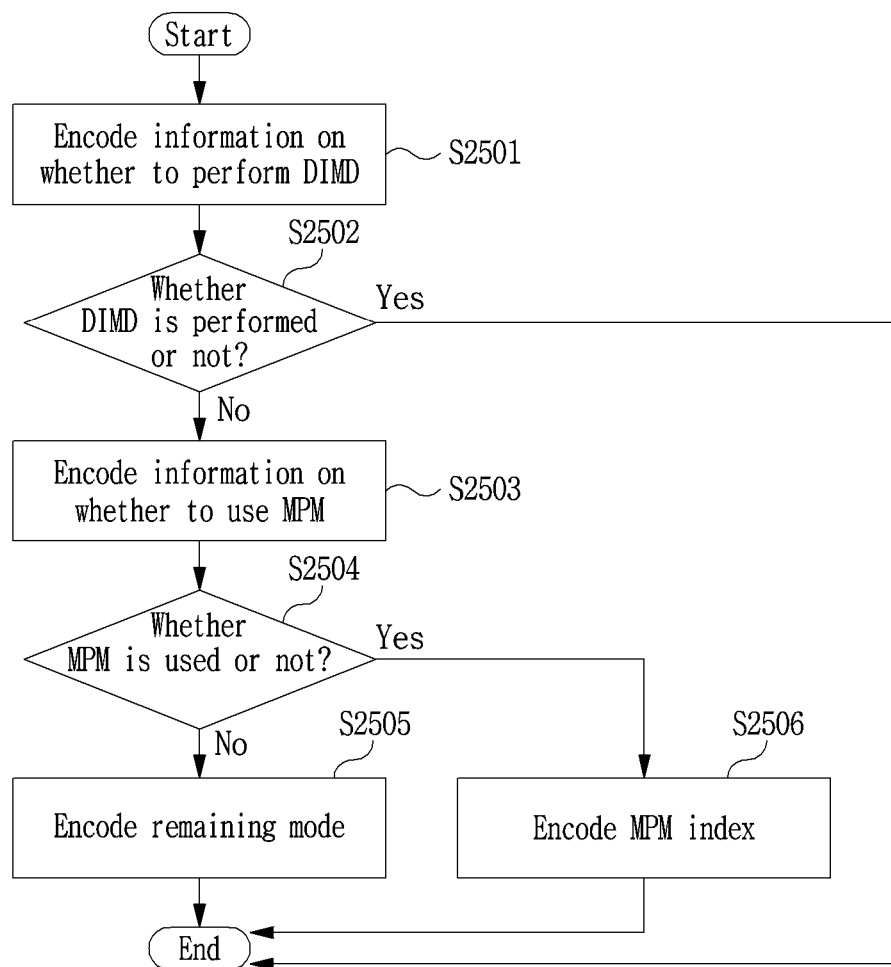
FIG. 26 is a flowchart illustrating a method of encoding an intra prediction mode when an image is encoded using the DIMD according to the present invention.

FIG. 26 is a flowchart illustrating a method of encoding an intra prediction mode when an image is encoded using the DIMD according to the present invention.

First, information indicating whether to perform the DIMD according to the present invention is encoded (S2501). This information is used to inform the image decoding apparatus 600 of an intra prediction mode derivation method. That is, whether the intra prediction mode is derived using the DIMD according to the present invention or another method is signaled.

After determining whether the DIMD according to the present invention is used (S2502), when it is determined that the DIMD has been used, the process ends and the intra prediction mode of the current block is derived through the DIMD.

However, when it is determined that the DIMD according to the present invention has not been used, information on whether or not MPM (Most Probable Mode) is applied is encoded (S2503). As an alternative to the DIMD-based intra prediction mode derivation method, MPM can be used.

An MPM flag and MPM index information indicating whether the intra prediction mode of the current block belongs to a most probable mode (MPM) list are transmitted to the image decoding apparatus 600. The number of intra prediction modes included in the MPM list is quite small compared to the total number of intra prediction modes. Therefore, when the intra prediction mode of the current block belongs to the MPM list, it is possible to signal to the image decoding apparatus 600 using much fewer bits. MPM index information represents that the intra prediction mode of the current block corresponds to which mode among the modes belonging to the MPM list.

When the MPM flag is 1, the intra prediction mode of the current block belongs to the MPM list. When the flag is 0, the intra prediction mode of the current block belongs to a group of the residual modes. The group of the residual modes includes all intra prediction modes other than the intra prediction modes belonging to the MPM list. In Step S2503, encoding of the most probable mode (MPM) is performed by encoding the MPM flag.

Referring to FIG. 26, after checking whether or not the MPM is used (S2504), when not used, the remaining modes other than the MPM candidates are realigned and the intra prediction mode of the current block is encoded (S2505). When the MPM is used, the MPM index indicating which intra prediction mode candidate has been used is encoded (S2506) and the process ends.

Sixth Embodiment

Figure 27:
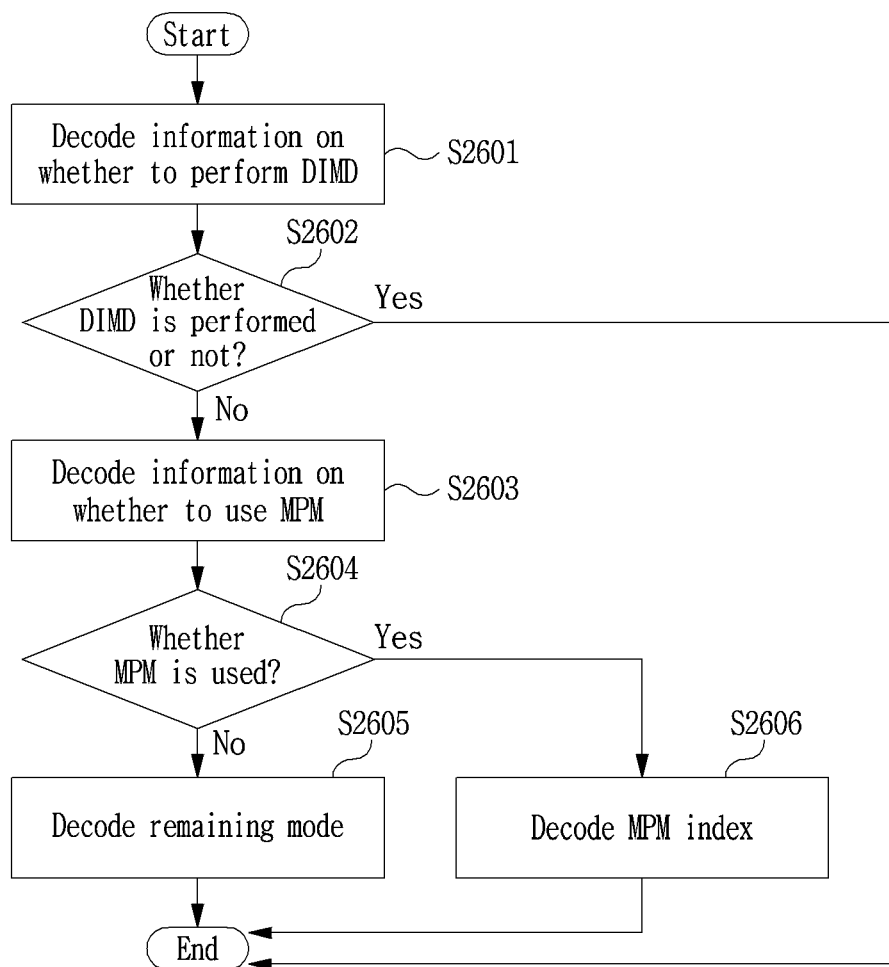
FIG. 27 is a flowchart illustrating a method of decoding an intra prediction mode when an image is decoded using the DIMD according to the present invention.

FIG. 27 is a flowchart illustrating a method of decoding an intra prediction mode when an image is decoded using the DIMD according to the present invention.

First, information indicating whether to perform the DIMD according to the present invention is decoded (S2601). This information indicates whether the intra prediction mode is derived using the DIMD according to the present invention or another method.

After determining whether the DIMD according to the present invention has been used (S2602), when it is determined that the DIMD has been used, the process ends and the intra prediction mode of the current block is derived through the DIMD.

However, when it is determined that the DIMD according to the present invention has not been used, information on whether or not the most probable mode (MPM) is used is decoded (S2603). In Step S2603, an MPM flag is decoded.

When the MPM flag is 1, the intra prediction mode of the current block belongs to the MPM list. When the flag is 0, the intra prediction mode of the current block belongs to a group of the residual modes. The group of the residual modes includes all intra prediction modes other than the intra prediction modes belonging to the MPM list.

Next, it is checked whether or not the MPM has been used (S2604). When it is determined that the MPM has not been used, the remaining modes other than the MPM candidates are re-aligned and the intra prediction mode of the current block is decoded (S2605). When it is determined that the MPM has been used, the MPM index indicating which intra prediction mode candidate has been used is decoded (S2606) and the process ends.

Seventh Embodiment

Figure 28:
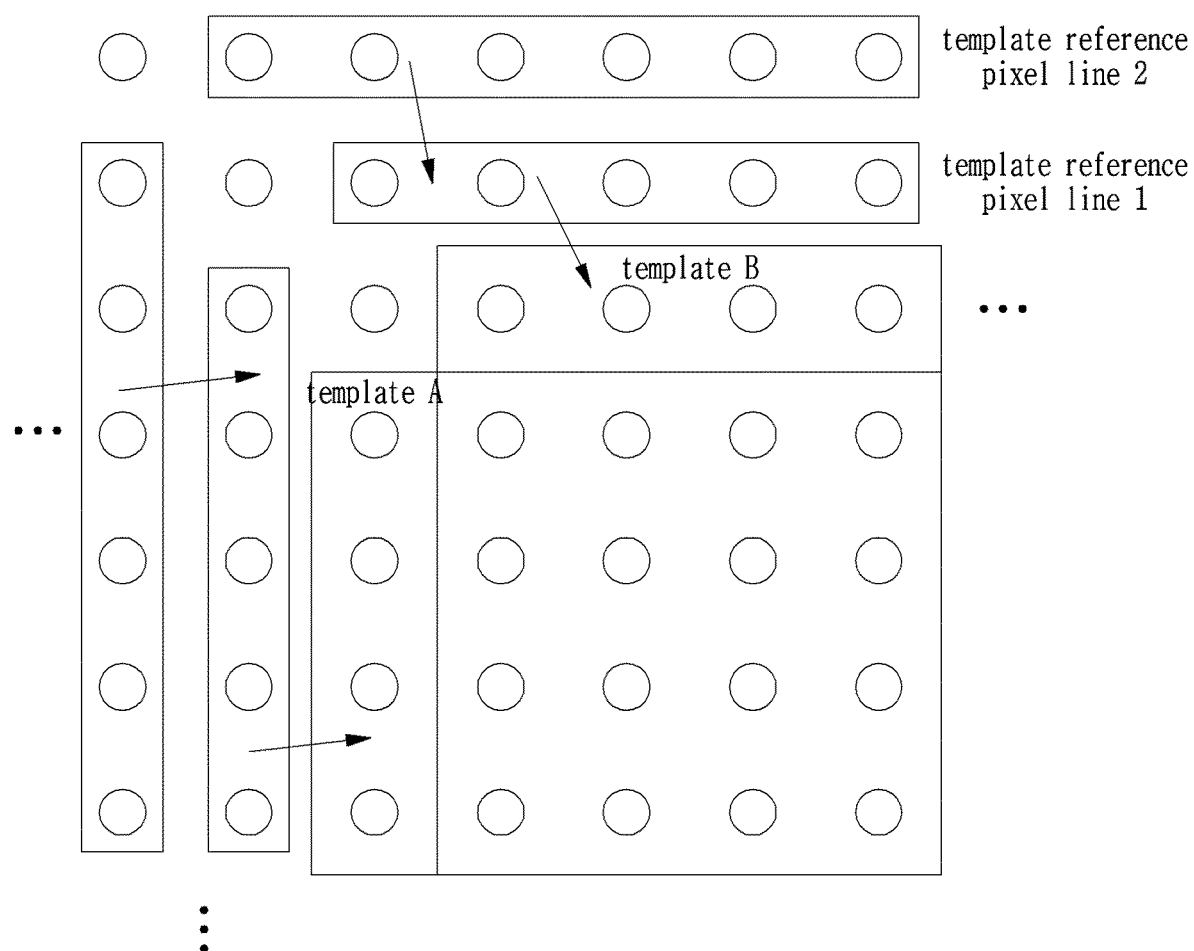
FIG. 28 is a diagram illustrating a seventh embodiment of the present invention.

FIG. 28 is a diagram illustrating a seventh embodiment of the present invention. The seventh embodiment of the present invention relates to a method of deriving an intra prediction mode using multiple reference pixel lines and a template.

As shown in FIG. 28, it is assumed that two reference sample lines including reference pixel line 1 and reference pixel line 2 are used as the reference pixel lines of the template. A case where the values of P and Q which represent the same of the template are all 1 will be described.

Angular modes existing on the right side of the mode of the upper left 45° direction are defined as upper-side angular modes. When these angular modes are used, a template B and upper-side reference pixel lines are used. Angular modes existing on the right side of the mode of the upper left 45° direction are defined as left-side angular modes. When these angular modes are used, a template A and left-side reference pixel lines are used. Next, prediction is performed for each reference pixel line as shown in FIG. 28 according to the intra prediction modes. For example, the reference pixel line 1 of the template is predicted using the reference pixel line 2 of the template, and an optimal intra prediction mode candidate 1 is generated. Next, the template is predicted using the reference pixel line 1 of the template, and an optimal intra prediction mode candidate 2 is generated. When the intra prediction mode candidates 1 and 2 are the same, this prediction mode is selected as the intra prediction mode of the current block. When the intra prediction mode candidates 1 and 2 are not the same, it is determined whether to perform one of the DIMD methods according to various embodiments of the present invention described above.

Figure 29:
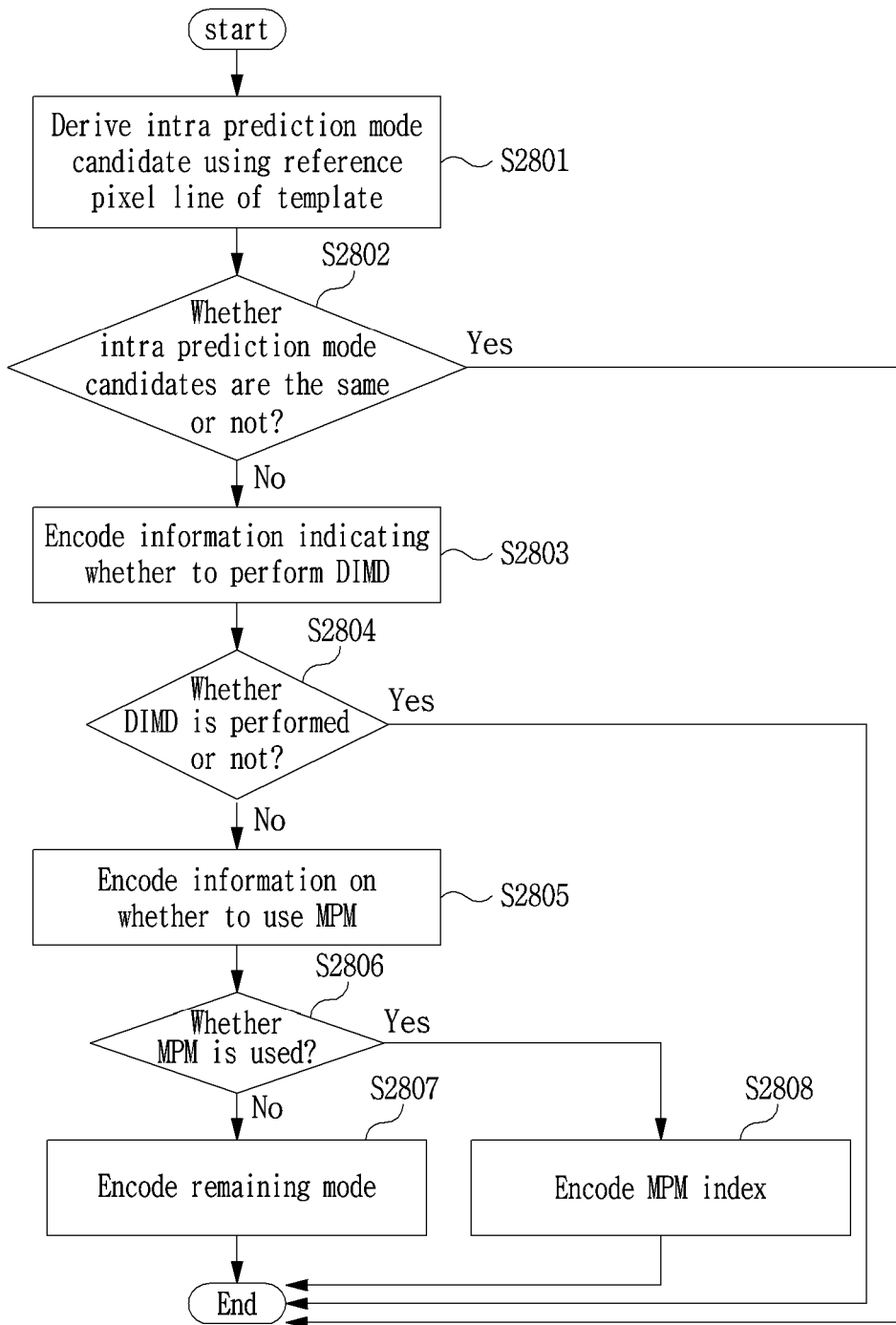
FIG. 29 is a flowchart illustrating a process of encoding an intra prediction mode when the seventh embodiment is used.

FIG. 29 is a flowchart illustrating a process of encoding an intra prediction mode when the seventh embodiment is used.

First, intraframe prediction mode candidates are derived using a reference pixel line of a template (S2801). Next, it is determined whether intra prediction mode candidates are the same (S2802). When they are the same, the same mode is selected as the intra prediction mode of the current block. When the intra prediction mode candidates are not the same, information on whether to perform the DIMD according to the present invention is encoded (S2803).

Since the subsequent steps S2804 through S2808 are substantially the same as S2502 through S2506 illustrated in FIG. 26, detailed description thereof will be omitted.

Figure 30:
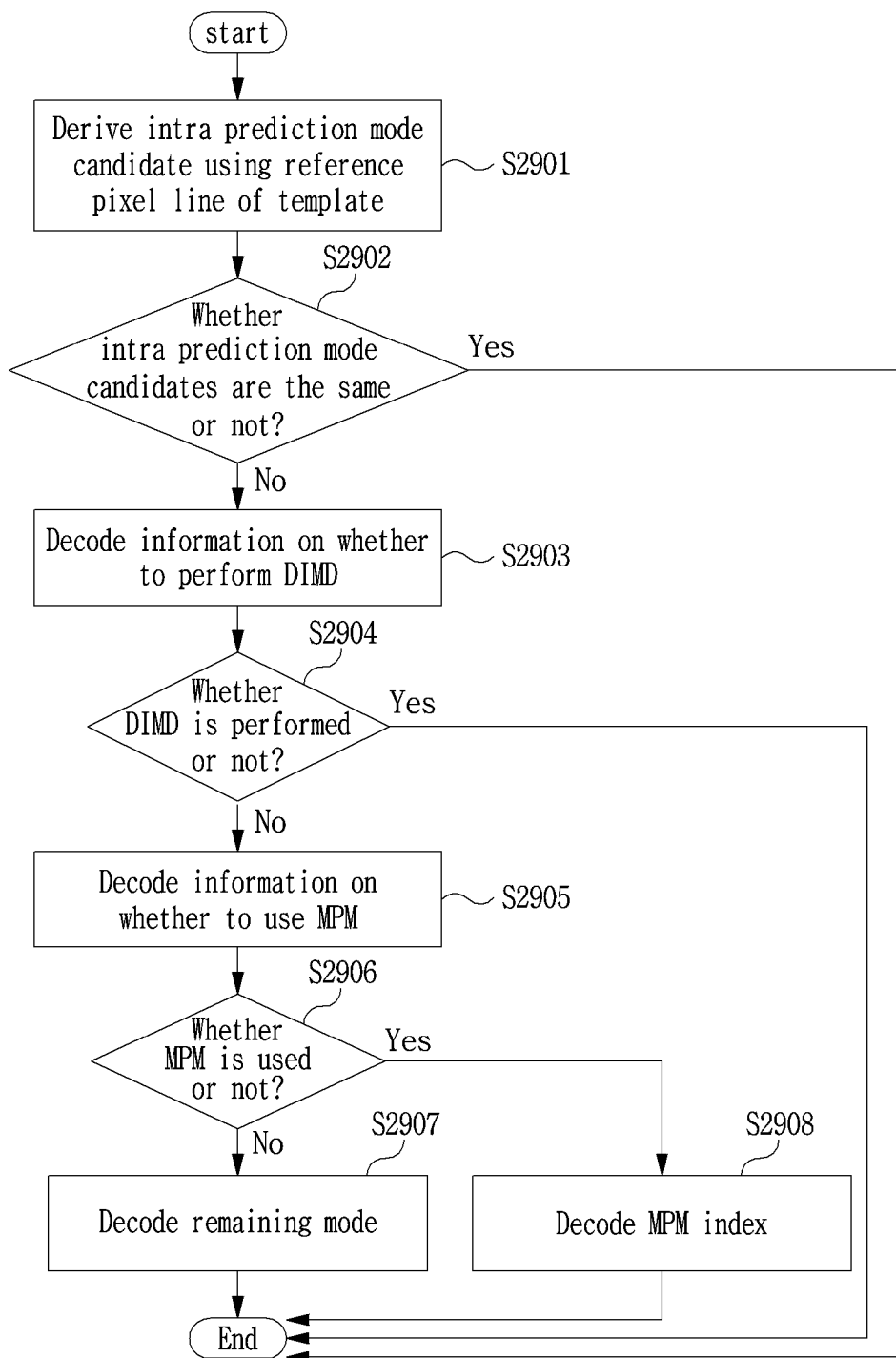
FIG. 30 is a flowchart illustrating a process of decoding an intra prediction mode when the seventh embodiment is used.

FIG. 30 is a flowchart illustrating a process of decoding an intra prediction mode when the seventh embodiment is used. The steps in the flowchart of FIG. 30 are substantially the same as the steps in the flowchart of FIG. 29, respectively, except that the steps in the flowchart of FIG. 30 are performed by the image decoding apparatus 600 rather than the image encoding apparatus. Therefore, detailed description of each step in FIG. 30 will be omitted.

<Modification to DIMD: Transmission of Template Index>

Figure 31A:
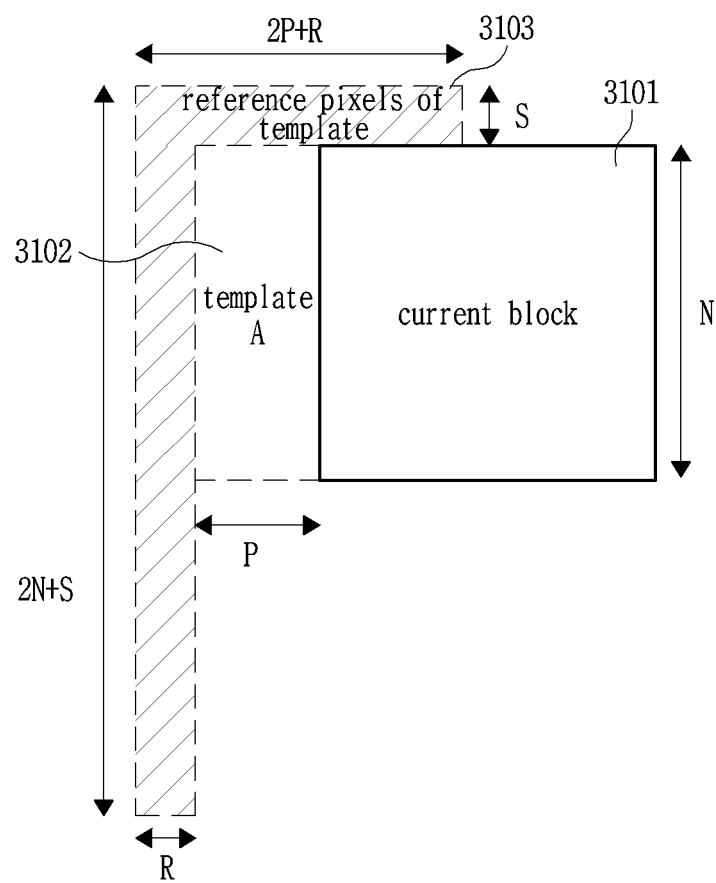
FIGS. 31A and 31B are diagrams illustrating modifications to a DIMD, in which a template index is transmitted.
Figure 31B:
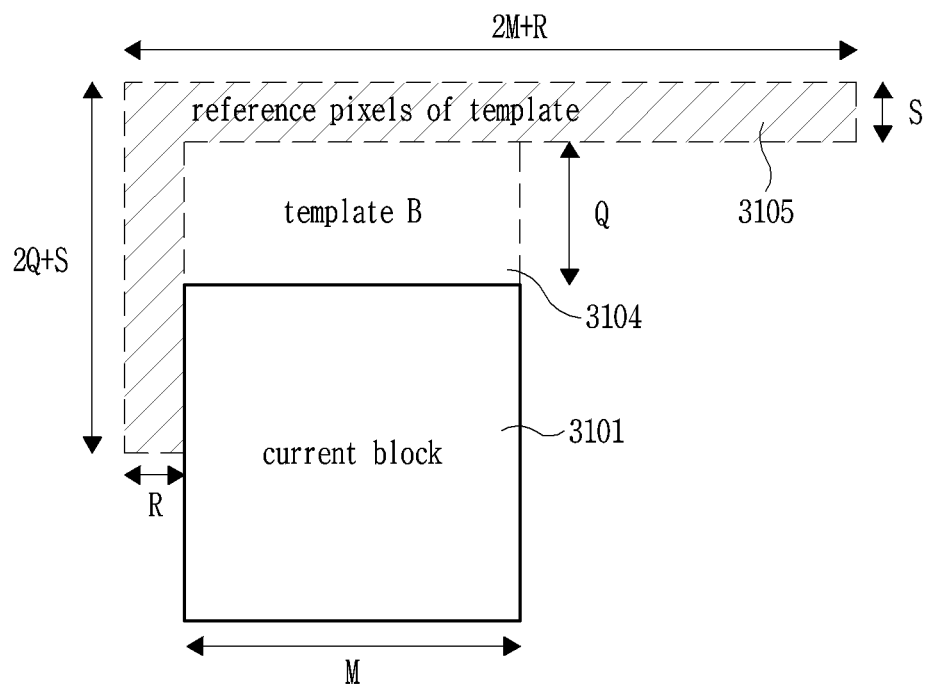

When one of the DIMDs according to the above-described various embodiments is used, the intra prediction mode itself is not signaled. However, in the present embodiment, intra prediction mode candidates are derived using multiple templates, and index information indicating which of the candidates is used is transmitted to the image decoding apparatus 600 from the image encoding apparatus 100. FIGS. 31A and 31B are diagrams illustrating a modification to the DIMD, in which a template index is transmitted. Referring to FIG. 31A and FIG. 31B, intra prediction mode candidates are generated using two templates and the DIMD according to the present invention, and an index is used to indicate the candidate to be used as the intra prediction mode of the current block. It is assumed that R and S representing the size of a reference pixel region of the template shown in FIG. 31A or 31B are both 1 for convenience of description.

In FIG. 31A, an intra prediction mode candidate 1 of a template A 3102 is derived by using the pixels within a template reference pixel region 3103. In FIG. 31A, an intra prediction mode candidate 2 of a template B 3104 is derived by using the pixels within a template reference pixel region 3105. Next, an index indicating that, among the intra prediction mode candidates derived from the multiple templates, the intra prediction mode derived from which template is used as the intra prediction mode of the current block 3101 is encoded, and the encoded index is transmitted to the image decoding apparatus 600.

On the other hand, information on with which intra prediction mode a block including the template is encoded can be used in this embodiment. For example, in FIG. 31A and FIG. 31B, assuming that an intra prediction mode of a block including the template A 3102 is an intra prediction mode A, when the intra prediction mode A is the same as the intra prediction mode that is derived by applying the template reference pixels to the template A 3102, a higher or lower priority can be given. It is possible to allocate bits at the time of arranging candidates for index setting according to the priority. Similarly, when there are multiple templates including the template A 3102, it is possible to set priorities at the time of allocating bits using the above-described criterion.

Figure 32:
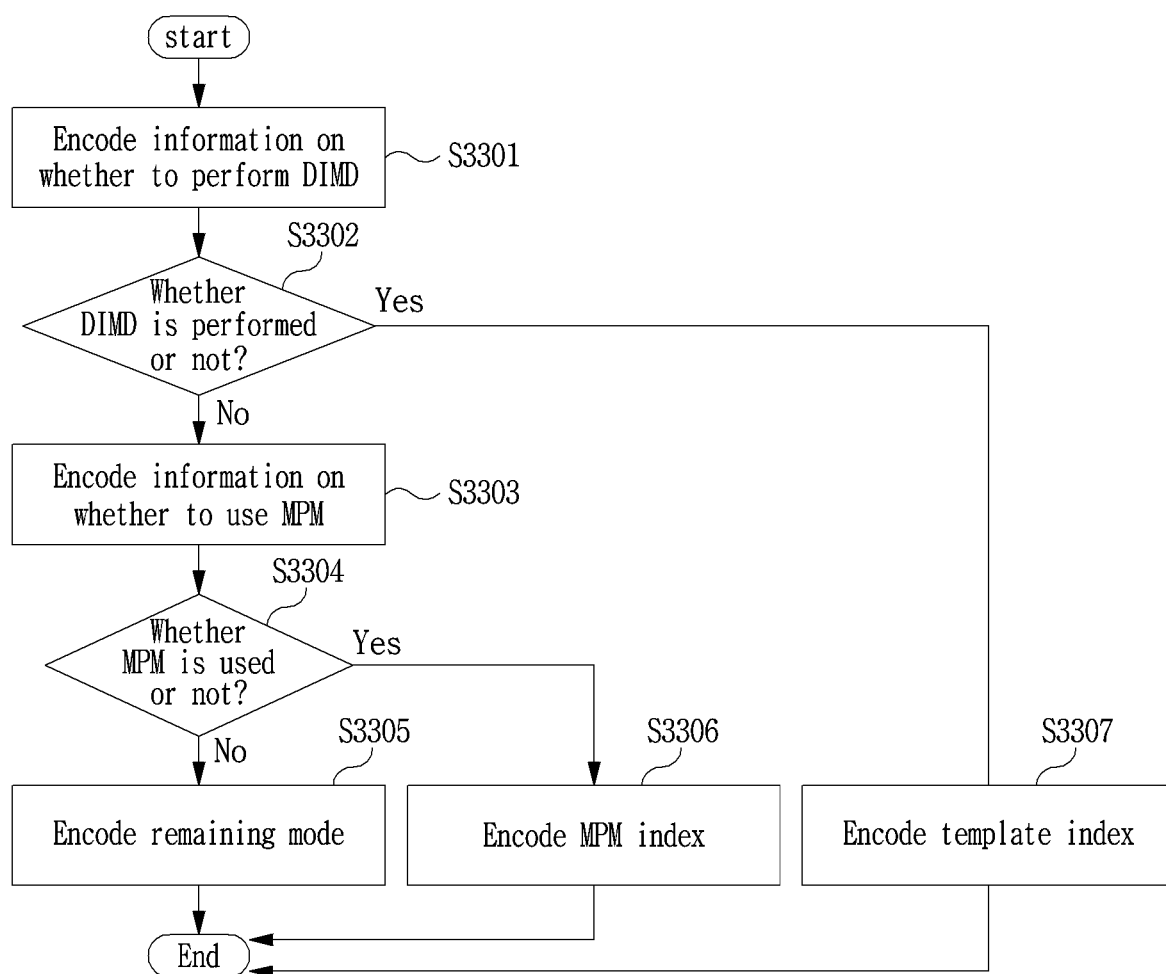
FIG. 32 is a flowchart illustrating a method of coding an intra prediction mode according to a DIMD in which a template index is used.

FIG. 32 is a flowchart illustrating a method of encoding an intra prediction mode according to a DIMD in which a template index is used.

First, information indicating whether or not the DIMD in which the template index is used is encoded (S3301). After determining whether the DIMD in which the template index is used has been performed (S3302), when it is determined that the DIMD has been performed, the template index is encoded and the process ends (S3307). However, when it is determined that the DIMD has not been performed, information on whether or not to apply the most probable mode (MPM) is encoded (S3303). Next, it is checked whether the MPM has been applied (S3304). When it is determined that the MPM has not be applied, the remaining modes except for MPM candidates are re-arranged and encoded (S3305). In contrast, when it is determined that the MPM has been applied, an MPM index indicating which candidate is applied is encoded (S3306), and the process ends.

Figure 33:
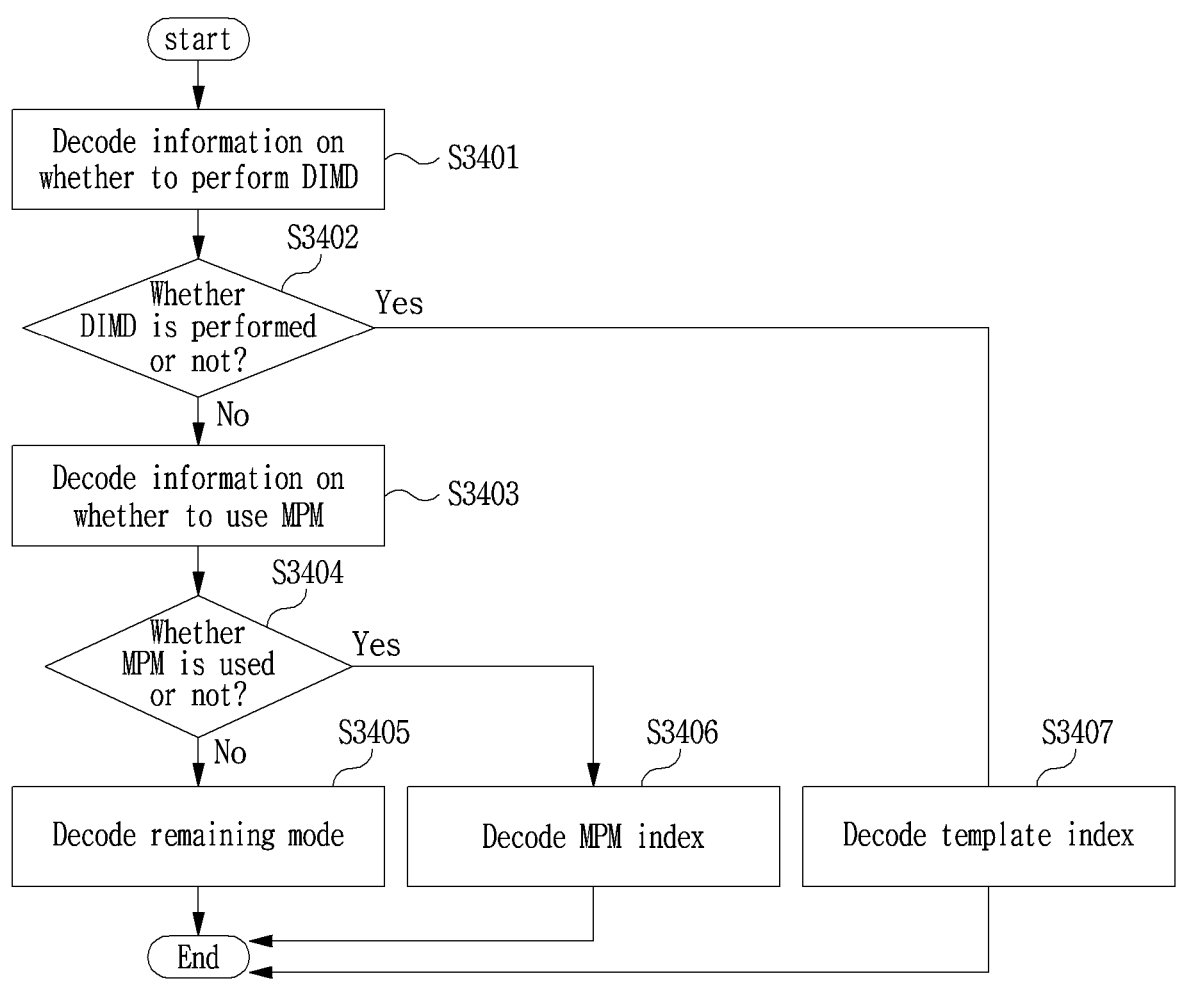
FIG. 33 is a flowchart illustrating a method of decoding an intra prediction mode according to a DIMD in which a template index is used.

FIG. 33 is a flowchart illustrating a method of decoding an intra prediction mode according to a DIMD in which a template index is used. The steps in the flowchart of FIG. 33 are substantially the same as the steps in the flowchart of FIG. 32, respectively, except that the steps in the flowchart of FIG. 33 are performed by the image decoding apparatus 600 rather than the image encoding apparatus. Therefore, detailed description of each step in FIG. 33 will be omitted.

Although FIGS. 31A and 31B illustrate that two templates adjacent to the current block are used, three or more templates may be used.

<Application Example of DIMD: Generation of MPM List>

In the methods described above, when the DIMD according to the present invention is used, the intra prediction mode itself is not signaled to the image decoding apparatus 600, or template index information indicating the intra prediction mode candidate derived by using which template of multiple templates is selected as the intra prediction mode of the current block is transmitted to the image decoding apparatus 600 from the image encoding apparatus 100.

Hereinafter, an embodiment will be described in which most probable mode candidates are re-arranged or an MPM list is generated using intra prediction modes derived according to the DIMD.

It is also possible to arrange the MPM candidates in the order in which the intra prediction modes derived by using the templates are arranged after generating the MPM candidates for prediction of the intra prediction mode.

First Embodiment

Figure 34:
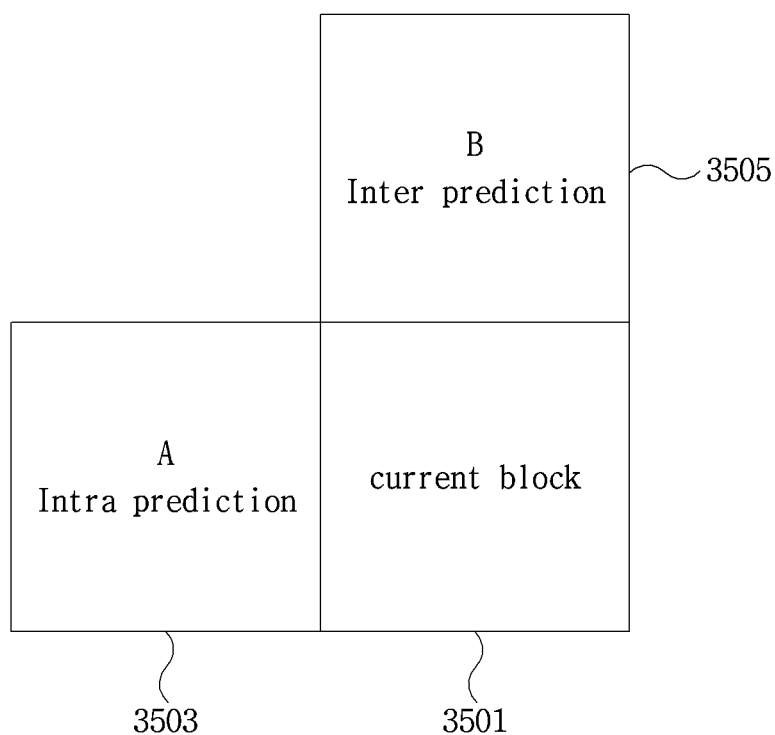
FIG. 34 is a diagram illustrating an example of a method of setting an intra prediction mode derived by using a template as an MPM candidate.

FIG. 34 is a diagram illustrating an example of a method of setting an intra prediction mode derived by using a template as an MPM candidate.

It is assumed that a reconstructed block A 3503 and a reconstructed block B 3505 are present around a current block 3501, the block A 3503 is predicted through intra prediction, and the block B 3505 is predicted through inter prediction. Since the block B 3505 is predicted through inter prediction, it does not have an intra prediction mode. Therefore, in the present embodiment, the intra prediction mode of the block B 3505 is generated using the template. The method of deriving the intra prediction mode of the block B 3505 by using the template can be understood by referring to the above-described methods. On the other hand, when deriving the intra prediction mode of the block B 3505 by using the template B 3104 of FIG. 31B, the intra prediction mode encoding method, the number of intra prediction modes, and the prediction angles need to be the same as those preset by the image encoding apparatus 100 or the image decoding apparatus 600.

Second Embodiment

In this embodiment, MPM candidates are determined depending on with which inter prediction mode a block containing a template is encoded.

Figure 35:
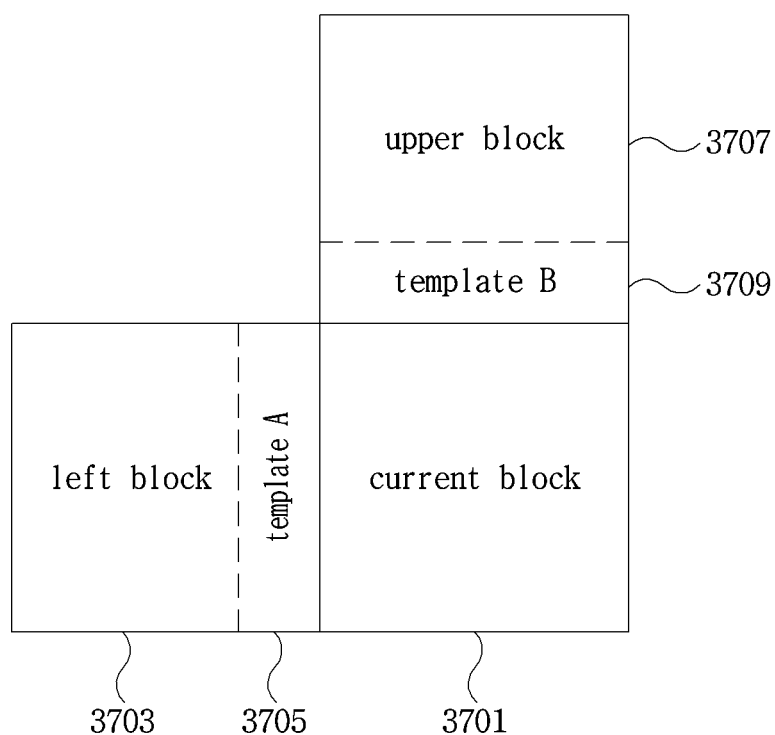
FIG. 35 is a diagram illustrating a method of setting an MPM candidate according to an embodiment of the present invention.

FIG. 35 is a diagram illustrating a method of setting an MPM candidate according to an embodiment of the present invention. Referring to FIG. 35, the intra prediction mode of the left-side block 3703 of the current block 3701 is assumed to be Mode 10, and the intra prediction mode derived by using template reference pixels (not illustrated) within a template A 3705 which is a portion of the left-side block 3703 is assumed to be Mode 12. Similarly, the intra prediction mode of the upper-side block 3707 of the current block 3701 is assumed to be Mode 28, and the intra prediction mode derived by using template reference pixels (not illustrated) within a template B 3709 which is a portion of the upper-side block 3707 is assumed to be Mode 28. In the case of the left-side block 3703, considering the entirety of the left-side block 3703, Mode 10 is advantageous for encoding over Mode 12. However, since Mode 12 is set for the template A 3705 adjacent to the current block 3701, it can be considered that Mode 12 is more appropriate as the prediction mode of the current block than Mode 10. In this case, the MPM candidate is generated using the intra prediction mode derived from the template A 3705 rather than the intra prediction mode of the left-side block 3703 when the MPM candidates are set.

In the case of the upper-side block 3707, since the intra prediction mode of the upper-side block 3707 is the same as the intra prediction mode derived from the template B 3709, the same intra prediction mode is used as the MPM candidate.

As an alternative, the MPM candidates can be set by using four modes including the intra prediction mode of the left-side block 3703, the intra prediction mode derived from the template A 3705, the intra prediction mode of the upper-side block 3707, and the intra prediction mode derived from the template B 3709. In this case, since the intra prediction mode derived by using the template is closer to the current block, the intra prediction mode derived by using the template is given a higher priority and a lesser number of bits is allocated for the derived intra prediction mode at the time of setting the MPM candidates.

Although the exemplary methods of the present disclosure are represented by a series of steps for clarity of description, they are not intended to limit the order in which the steps are performed. That is, if necessary, each step may be performed in parallel or performed in series in a different order. In order to implement the method according to the present disclosure, each of the embodiments described above can be modified such that some additional steps can be added to a corresponding embodiment or some existing steps can be eliminated from a corresponding embodiment. Alternatively, some additional steps are added and some existing steps are eliminated from a corresponding of the embodiments.

Various embodiments in the present disclosure are not intended to represent all of the possible combinations based on technical spirit of the present invention but are provided only for illustrative purposes. Elements or steps described in various embodiments can be applied independently or in combination.

Various embodiments in the present disclosure can be implemented by hardware, firmware, software, or a combination thereof. When implemented by hardware, each of the embodiments can be implemented by one or more application specific integrated circuits (ASICs), digital signal processors (DSPs), digital signal processing devices (DSPDs), programmable logic devices (PLDs), field programmable gate arrays (FPGAs), general processors, controllers, micro controllers, or micro-processors.

The scope of the present disclosure covers software or machine-executable commands (for example, operating systems (OSs), application programs, firmware, programs) that enable steps in various embodiments to be performed in a certain device or computer, and a non-transitory computer-readable medium in which such software or commands are stored so as to be executable in a certain device or computer when read out.

INDUSTRIAL APPLICABILITY

The present invention can be used for video signal encoding or decoding.

The invention claimed is:

1. A video decoding method, comprising:
selecting at least one reference pixel line among a plurality of reference pixel lines, the plurality of reference pixel lines being included in a current picture including a current block;
deriving an intra prediction mode of the current block;
generating a prediction block of the current block based on the at least one reference pixel line and the intra prediction mode of the current block; and
performing filtering on one or more pixels in the prediction block based on at least one reference pixel in the plurality of reference pixel lines,
wherein the one or more pixels in the prediction block are determined based on a size of the prediction block, and
wherein, in case that the intra prediction mode of the current block is derived as a predetermined angular mode, a first pixel in the prediction block is filtered based on a first reference pixel included in the at least one reference pixel line.

2. The video decoding method of claim 1,
wherein the predetermined angular mode has a 45 degree up-right prediction direction.

3. The video decoding method of claim 1,
wherein the first reference pixel is positioned in a direction opposite to a prediction direction of the predetermined angular mode.

4. The video decoding method of claim 1,
wherein a reference pixel line including the first reference pixel is positioned adjacent to the prediction block.

5. The video decoding method of claim 1,
wherein the first pixel is filtered by applying a first weighted value for the first reference pixel.

6. The video decoding method of claim 5,
wherein the first weighted value is determined based on a distance between the first pixel and the first reference pixel.

7. The video decoding method of claim 5,
wherein the first weighted value decreases as a distance between the first pixel and the first reference pixel increases.

8. A video encoding method, comprising:
selecting at least one reference pixel line among a plurality of reference pixel lines, the plurality of reference pixel lines being included in a current picture including a current block;
deriving an intra prediction mode of the current block;
generating a prediction block of the current block based on the at least one reference pixel line and the intra prediction mode of the current block;
performing filtering on one or more pixels in the prediction block based on at least one reference pixel in the plurality of reference pixel lines; and
encoding first information for the intra prediction mode of the current block and second information for the at least one reference pixel line,
wherein the one or more pixels in the prediction block are determined based on a size of the prediction block, and
wherein, in case that the intra prediction mode of the current block is derived as a predetermined angular mode, a first pixel in the prediction block is filtered based on a first reference pixel included in the at least one reference pixel line.

9. A non-transitory computer-readable recording medium storing a bitstream generated by a video encoding method, the video encoding method comprising:
selecting at least one reference pixel line among a plurality of reference pixel lines, the plurality of reference pixel lines being included in a current picture including a current block;
deriving an intra prediction mode of the current block;
generating a prediction block of the current block based on the at least one reference pixel line and the intra prediction mode of the current block;
performing filtering on one or more pixels in the prediction block based on at least one reference pixel in the plurality of reference pixel lines; and
encoding first information for the intra prediction mode of the current block and second information for the at least one reference pixel line into a bitstream,
wherein the one or more pixels in the prediction block are determined based on a size of the prediction block, and
wherein, in case that the intra prediction mode of the current block is derived as a predetermined angular mode, a first pixel in the prediction block is filtered based on a first reference pixel included in the at least one reference pixel line.

* * * * *